US011566087B2

(12) United States Patent
Nishino et al.

(10) Patent No.: US 11,566,087 B2
(45) Date of Patent: Jan. 31, 2023

(54) METHOD FOR PRODUCING STATISTICAL COPOLYMER CONTAINING CHLOROPRENE MONOMER UNIT AND UNSATURATED NITRILE MONOMER UNIT, STATISTICAL COPOLYMER, LATEX AND USE OF SAME

(71) Applicant: DENKA COMPANY LIMITED, Tokyo (JP)

(72) Inventors: Wataru Nishino, Itoigawa (JP); Suguru Onuki, Itoigawa (JP); Kosuke Fujimoto, Itoigawa (JP); Yuhei Ishigaki, Itoigawa (JP); Shogo Hagiwara, Itoigawa (JP); Uichiro Yamagishi, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 394 days.

(21) Appl. No.: 16/612,848

(22) PCT Filed: May 11, 2018

(86) PCT No.: PCT/JP2018/018431
§ 371 (c)(1),
(2) Date: Nov. 12, 2019

(87) PCT Pub. No.: WO2018/207940
PCT Pub. Date: Nov. 15, 2018

(65) Prior Publication Data
US 2020/0199260 A1    Jun. 25, 2020

(30) Foreign Application Priority Data

May 12, 2017   (JP) .............................. JP2017-095976
Mar. 14, 2018  (JP) .............................. JP2018-047092

(51) Int. Cl.
*C08F 2/38*    (2006.01)
*C08F 236/12*  (2006.01)
*C08L 11/00*   (2006.01)

(52) U.S. Cl.
CPC .............. *C08F 2/38* (2013.01); *C08F 236/12* (2013.01); *C08L 11/00* (2013.01)

(58) Field of Classification Search
CPC ........... C08F 2/38; C08F 236/12; C08L 11/00
See application file for complete search history.

(56) References Cited

U.S. PATENT DOCUMENTS 2,066,331 A     1/1937  Carothers et al.
2,395,649 A *   2/1946  Wagner ................. C08F 236/16
                                                        526/79
5,496,884 A     3/1996  Weih et al.
9,085,686 B2    7/2015  Jung et al.
9,932,433 B2    4/2018  Lee et al.

FOREIGN PATENT DOCUMENTS

| CN | 104603169 A | 5/2015 |
|---|---|---|
| CN | 105764942 A | 7/2016 |
| EP | 3026067 A1 | 6/2016 |
| GB | 570662 A | 7/1945 |
| GB | 858444 A | 1/1961 |
| JP | S45-029992 B1 | 9/1970 |
| JP | S46-016424 B2 | 5/1971 |
| JP | S47-022094 B1 | 6/1972 |
| JP | S53-023390 A | 3/1978 |
| JP | S55-099907 A | 7/1980 |
| JP | S55-145715 A | 11/1980 |
| JP | S56-038336 A | 4/1981 |
| JP | H09-505842 A | 6/1997 |
| JP | 2001-011201 A | 1/2001 |
| JP | 2012-082289 A | 4/2012 |
| JP | 5689275 B2 | 3/2015 |
| JP | 5918767 B2 | 5/2016 |
| WO | 2013/015043 A1 | 1/2013 |

OTHER PUBLICATIONS

Europe Patent Office, "Search Report for European Patent Application No. 18797563.6," dated Feb. 19, 2020.
Yan Lei et al., "Handbook of Practical Chemical Materials—Synthetic Materials and Additives Thereof", Guangdong Science & Technology Press, May 31, 1994.
PCT/ISA/210, "International Search Report for International Application No. PCT/JP2018/018431," dated Jul. 31, 2018.
PCT/IB/373, "International Preliminary Report on Patentability for International Application No. PCT/JP2018/018431," dated Nov. 12, 2019.
PCT/ISA/237, "Written Opinion of the International Searching Authority for International Application No. PCT/JP2018/018431," dated Jul. 31, 2018.

* cited by examiner

*Primary Examiner* — Robert D Harlan
(74) *Attorney, Agent, or Firm* — Manabu Kanesaka

(57) ABSTRACT

To provide a statistical copolymer containing a chloroprene monomer unit and an unsaturated nitrile monomer unit which has a satisfactory oil resistance. A method for producing a statistical copolymer containing a chloroprene monomer unit and an unsaturated nitrile monomer unit includes a step for conducting continuous addition or 10 cycles or more of intermittent portionwise addition of the chloroprene monomer after initiation of a polymerization reaction is provided. A rubber composition using a statistical copolymer according to the invention or a vulcanized molded article containing the rubber composition is excellent in terms of oil resistance, mechanical strength, compression set at a low temperature and flex fatigue resistance.

25 Claims, No Drawings

METHOD FOR PRODUCING STATISTICAL COPOLYMER CONTAINING CHLOROPRENE MONOMER UNIT AND UNSATURATED NITRILE MONOMER UNIT, STATISTICAL COPOLYMER, LATEX AND USE OF SAME

RELATED APPLICATIONS

The present application is National Phase of International Application No. PCT/JP2018/018431 filed May 11, 2018, and claims priorities from Japanese Applications No. 2017-095976, filed May 12, 2017; and No. 2018-047092, filed Mar. 14, 2018, the disclosures of which are hereby incorporated by reference herein in its entirety.

TECHNICAL FIELD

The present invention relates to a method for producing a statistical copolymer containing a chloroprene monomer unit and an unsaturated nitrile monomer unit, a statistical copolymer, a latex and use of the same.

BACKGROUND ART

Methods for copolymerizing chloroprene and an unsaturated nitrile compound have been known since a long time ago, and one example is a bulk polymerization using ultra-violet irradiation (see Patent Document 1). It is difficult by this method to increase the acrylonitrile copolymerization quantity due to the difference in the reactivity between chloroprene and acrylonitrile. For overcoming this difficulty, chloroprene is added portionwise to keep a high concentration of acrylonitrile in monomers as disclosed in a known method (see Patent Document 2). There is also a known method for producing a chloroprene copolymer which incorporates an unsaturated nitrile for the purpose of improving the oil resistance (see Patent Document 3). These copolymers are vulcanized and molded, and employed preferably in power transmission belts, conveyer belts, hoses, wipers, dip products, seal members, adhesives, boots, rubberized fabrics, rubber rolls, vibration-proof rubbers and sponge products (see Patent Documents 4 and 5).

CITATION LIST

Patent Document

Patent Document 1: U.S. Pat. No. 2,066,331
Patent Document 2: U.S. Pat. No. 2,395,649
Patent Document 3: JP-A No. S55-145715
Patent Document 4: JP-A No. 2012-82289
Patent Document 5: WO2013/015043
Patent Document 6: JP No. 5918767
Patent Document 7: JP No 5689275

Non-Patent Document

SUMMARY OF THE INVENTION

Technical Problem

The chloroprene copolymer obtained by the method in Patent Document 3 has an oil resistance which is sometimes not sufficient.

Accordingly, a major objective of the present invention is to provide a statistical copolymer containing a chloroprene monomer unit and an unsaturated nitrile monomer unit whose oil resistance is satisfactory and whose various dynamic properties are also satisfactory.

Solution to Problem

Thus, the present invention provides a method for producing a statistical copolymer containing a chloroprene monomer unit and an unsaturated nitrile monomer unit comprising a step for conducting continuous addition or 10 cycles or more of intermittent portionwise addition of the chloroprene monomer after initiation of a polymerization reaction. By this production method, the ratio between unreacted chloroprene monomer and unsaturated nitrile monomer in the polymerization fluid can be kept constant during the polymerization.

The aforementioned production method may comprise a step for determining the quantity of the chloroprene monomer to be added during time period $dt(n+1)$ between time $t(n)$ and time $t(n+1)$ based on the total quantity of polymerization conversion of the chloroprene monomer and the unsaturated nitrile monomer during time period $dt(n)$ between time $t(n-1)$ and time $t(n)$ wherein the time at which the polymerization reaction is initiated is $t(0)$ and n is an integer of 1 or more, thereby keeping the ratio between unreacted chloroprene monomer and unsaturated nitrile monomer constant.

As used herein, to keep the ratio between unreacted chloroprene monomer and unsaturated nitrile monomer in the polymerization fluid constant during the polymerization means that the mass ratio between the unsaturated nitrile monomer and the total of the chloroprene monomer and the unsaturated nitrile monomer is preferably within ±10%, more preferably within ±5% of the target value. For example, when the mass ratio between the unsaturated nitrile monomer and the total of unreacted chloroprene monomer and unsaturated nitrile monomer in the polymerization fluid is kept at 0.50 during the polymerization, preferably the range from 0.40 to 0.60, more preferably the range from 0.45 to 0.55 is intended.

The aforementioned production method, for example when the mass ratio between the unsaturated nitrile monomer and the total of unreacted chloroprene monomer and unsaturated nitrile monomer in the polymerization fluid is kept at 0.50, may comprise, after initiation of the polymerization reaction, a step for calculating the polymerization rate of the chloroprene monomer and the unsaturated nitrile monomer based on the specific gravity of a latex containing the chloroprene monomer and the unsaturated nitrile monomer, a step for calculating the unreacted chloroprene monomer quantity and the unreacted unsaturated nitrile monomer quantity based on the polymerization rate and a step, at the time point when the difference between the unreacted chloroprene monomer quantity and unsaturated nitrile monomer quantity becomes identical to a scheduled portionwise addition quantity which is a quantity obtained by dividing the total quantity of the chloroprene monomer scheduled to be added in the intermittent portionwise addition by the number of portionwise addition cycles, for conducting portionwise addition of the chloroprene monomer in the scheduled portionwise addition quantity to the latex.

In the aforementioned production method, a xanthic compound may be added as a chain transfer agent.

In the aforementioned production method, the polymerization temperature can be kept at 5 to 20° C.

The present invention provides a statistical copolymer containing a chloroprene monomer unit and an unsaturated nitrile monomer unit produced by conducting continuous addition or 10 cycles or more of intermittent portionwise addition of the chloroprene monomer after initiation of a polymerization reaction.

The present invention provides a statistical copolymer containing a chloroprene monomer unit and an unsaturated nitrile monomer unit produced by determining the quantity of the chloroprene monomer to be added during time period dt(n+1) between time t(n) and time t(n+1) based on the total quantity of polymerization conversion of the chloroprene monomer and the unsaturated nitrile monomer during time period dt(n) between time t(n−1) and time t(n) wherein the time at which the polymerization reaction is initiated is t(0) and n is an integer of 1 or more, thereby keeping the ratio between unreacted chloroprene monomer and unsaturated nitrile monomer constant.

A statistical copolymer according to the present invention can be produced by keeping the polymerization temperature at 5 to 20° C.

The aforementioned statistical copolymer may be employed in power transmission belts, conveyer belts, hoses, wipers, dip products, seal members, adhesives, boots, rubberized fabrics, rubber rolls, vibration-proof rubbers or sponge products.

In the present invention, a statistical copolymer containing a chloroprene monomer unit and an unsaturated nitrile monomer unit characterized in that it enables that, when a vulcanized rubber prepared in accordance with the sample preparation condition (I) described below using this statistical copolymer is evaluated, the oil resistance to IRM903 oil measured in accordance with JIS K6258 is ΔW<15%, the compression set after 72 hours at 0° C. measured in accordance with JIS K 6262 is 25% or less, preferably 20% or less, and the flex fatigue resistance at 40° C. measured in accordance with JIS K 6260 is 100,000 cycles or more is provided.

(Sample Preparation Condition (I))

100 Parts by mass of the statistical copolymer, 2 parts by mass of 4,4'-bis(α,α-dimethylbenzyl)diphenylamine, 4 parts by mass of magnesium oxide, 50 parts by mass of a carbon black, 5 parts by mass of a polyether ester-based plasticizer, 5 parts by mass of zinc oxide, 1.5 parts by mass of ethylene thiourea and 1 part by mass of N-phenyl-N'-(1,3-dimethylbutyl)-p-phenylenediamine are kneaded for 20 minutes using an 8-inch roll whose cooling water temperature is set at 40° C. to obtain a rubber composition. The resultant rubber composition is subjected to a heat treatment based on JIS K 6250 using an electric heat press at 170° C. for 20 minutes followed by entry into heated air at 170° C. for 2 hours, thereby preparing a vulcanized rubber.

The statistical copolymer according to the present invention enables that, when a vulcanized rubber prepared in accordance with the sample preparation condition (I) described above is evaluated, the mechanical characteristics measured in accordance with JIS K6251 include a tensile strength at break >20 MPa and an elongation at break >300%.

The statistical copolymer according to the present invention can be used in power transmission belts, conveyer belts, hoses, wipers, dip products, seal members, adhesives, boots, rubberized fabrics, rubber rolls, vibration-proof rubbers or sponge products.

The present invention provides a latex containing the aforementioned statistical copolymer.

The aforementioned latex may be employed in adhesives, dip products, or resolcinol-formaldehide latex (RFL)-treated products.

The present invention provides a rubber composition containing the aforementioned statistical copolymer.

The present invention provides a vulcanized molded article containing the aforementioned rubber composition.

The aforementioned vulcanized molded article may also be a power transmission belt, a conveyer belt, a hose, a wiper, a dip product, a seal member, an adhesive, a boot, a rubber fabric, a rubber roll, a vibration-proof rubbers or a sponge product.

The present invention provides a vulcanized molded article containing a statistical copolymer of a chloroprene monomer unit and an unsaturated nitrile monomer unit containing the unsaturated nitrile monomer unit at 8 to 20% by mass, more preferably κ to 17% by mass, whose oil resistance to IRM903 oil measured in accordance with JIS K6258 is ΔW<+15%.

The vulcanized molded article according to the present invention may have a compression set after 72 hours at 0° C. measured in accordance with JIS K 6262 of 25% or less.

The vulcanized molded article according to the present invention may also have a flex fatigue resistance at 40° C. measured in accordance with JIS K 6260 of 100,000 cycles or more.

The vulcanized molded article according to the present invention can be used in power transmission belts, conveyer belts, hoses, wipers, dip products, seal members, adhesives, boots, rubberized fabrics, rubber rolls, vibration-proof rubbers or sponge products.

The vulcanized molded article according to the present invention enables that the mechanical characteristics measured in accordance with JIS K6251 are a tensile strength at break >20 MPa and an elongation at break >300%.

The present invention provides a vulcanized molded article containing a statistical copolymer of a chloroprene monomer unit and an unsaturated nitrile monomer unit containing the unsaturated nitrile monomer unit at 8 to 20% by mass whose oil resistance to IRM903 oil measured in accordance with JIS K6258 is ΔW<+15% and whose compression set after 72 hours at 0° C. measured in accordance with JIS K 6262 is 20% or less.

The vulcanized molded article according to the present invention can be used in seal members or hose members.

The vulcanized molded article according to the present invention enables that the mechanical characteristics measured in accordance with JIS K6251 are a tensile strength at break >20 MPa and an elongation at break >300%.

As used herein, a "statistical copolymer" means a copolymer allows a monomer chain distribution to be described based on Bernoulli's statistic model or a primary or secondary Markov's statistic model as described in J. C. Randall "POLYMER SEQUENCE DETERMINATION, Carbon-13 NMR Method" Academic Press, New York, 1977, pages 71-78. In addition, although the statistical copolymer containing a chloroprene monomer unit and an unsaturated nitrile monomer unit according to the present embodiment is not limited particularly, it enables that, when constituted from a binary system monomer, reactivity ratios r1 and r2 assuming the chloroprene monomer as M1 in the Mayo-Lewis Formula (I) shown below allow r1 to be within the range from 0.3 to 3000 and r2 to be within the range from $10^{-5}$ to 3.0. Also from another point of view, a "statistical copolymer", as used herein, refers to a copolymer obtained by a radical polymerization using multiple types of monomers. The present "statistical copolymer" is a concept encompassing substantially random copolymers.

[Equation 1]

$$\frac{d[M1]}{d[M2]} = \frac{[M1]}{[M2]} \times \frac{r_1[M1]+[M2]}{[M1]+r_2[M2]} \quad (I)$$

Advantageous Effects of Invention

Accordingly to the present invention, a statistical copolymer containing a chloroprene monomer unit and an unsaturated nitrile monomer unit whose oil resistance is satisfactory and whose various dynamic properties are also satisfactory can be provided.

DESCRIPTION OF EMBODIMENTS

The followings are the description of the embodiments for conducting the present invention. The embodiments described below indicate the embodiments representative of the present invention, by which the scope of the present invention is not interpreted narrowly.

<1. Statistical Copolymer Production Method>

A production method of the present embodiment comprises, in a step for polymerizing a chloroprene monomer and an unsaturated nitrile monomer, a step for conducting continuous addition or 10 cycles or more of intermittent portionwise addition of the chloroprene monomer after initiation of a polymerization reaction. As a result, a statistical copolymer containing a chloroprene monomer unit and an unsaturated nitrile monomer unit (hereinafter referred to simply as "statistical copolymer") is produced. As used herein, "after initiation of a polymerization reaction" means "after addition of the polymerization initiator".

While the polymerization method is not limited particularly, a radical polymerization is preferred. The radical polymerization may for example be solution polymerization, bulk polymerization, emulsion polymerization and suspension polymerization, among which emulsion polymerization is preferred.

A chloroprene monomer has a high reaction rate than that of an unsaturated nitrile monomer. As a result, the chloroprene monomer is consumed more rapidly than the unsaturated nitrile monomer in a polymerization system. When the ratio between the chloroprene monomer and the unsaturated nitrile monomer undergoes deviation, the resultant statistical copolymer may have a reduced oil resistance. In the production method of the present embodiment, by adding mainly the chloroprene monomer which was reduced by the polymerization by means of continuous addition or 10 cycles or more of intermittent portionwise addition, the ratio between the chloroprene monomer and the unsaturated nitrile monomer in the polymerization system can be kept constant. Consequently, a statistical copolymer having an oil resistance improved when compared to the prior art can be obtained. In addition, the statistical copolymer produced by the production method of the present embodiment has an excellent mechanical strength as shown in Examples described below.

In the production method of the present embodiment, the chloroprene monomer is preferred to be added continuously or intermittently so that the ratio between unreacted chloroprene monomer and unsaturated nitrile monomer in the polymerization system becomes constant. The ratio between unreacted chloroprene monomer and unsaturated nitrile monomer in the polymerization system (unreacted chloroprene monomer/unreacted unsaturated nitrile monomer) is preferably 10/90 to 90/10 as a mass ratio from the viewpoint of improving the characteristics of a rubber containing the statistical copolymer.

In the production method of the present embodiment, a part of the chloroprene monomer is added to the polymerization system before polymerization initiation reaction to the polymerization system, and then after the polymerization initiation the remainder of the chloroprene monomer may be added by continuous addition or 10 cycles or more of intermittent portionwise addition. The ratio between the total of the chloroprene monomer and the unsaturated nitrile monomer to water ((chloroprene monomer+unsaturated nitrile monomer)/water) before polymerization initiation is preferably 100/50 to 100/1000 as a mass ratio from the viewpoint of improved producibility.

A specific example of the method for conducting continuous addition or 10 cycles or more of intermittent portionwise addition of the chloroprene monomer is described below. Firstly, one example of the method for conducting continuous addition of the chloroprene monomer is described.

When conducting the continuous addition, the production method of the present embodiment preferably comprises a step for determining the quantity of the chloroprene monomer to be added during time period $dt(n+1)$ between time $t(n)$ and time $t(n+1)$ based on the total quantity of polymerization conversion of the chloroprene monomer and the unsaturated nitrile monomer during time period $dt(n)$ between time $t(n-1)$ and time $t(n)$ wherein the time at which the polymerization reaction is initiated is $t(0)$ and n is an integer of 1 or more, thereby keeping the ratio between unreacted chloroprene monomer and unsaturated nitrile monomer constant.

In the aforementioned production method, the chloroprene monomer to be added during time period $dt(n+1)$ between time $t(n)$ and time $t(n+1)$ for the purpose of keep the ratio between unreacted chloroprene monomer and unsaturated nitrile monomer at constant may contain the unsaturated nitrile monomer in a relatively small quantity compared to the chloroprene monomer. When the unsaturated nitrile monomer in a relatively small quantity compared to the chloroprene monomer to be added is contained, its mass ratio (unsaturated nitrile monomer/chloroprene monomer) is limited at maximum to the mass ratio (unsaturated nitrile monomer component/chloroprene monomer component) in the statistical copolymer to be polymerized under this production condition. For example, when the mass ratio (unsaturated nitrile monomer component/chloroprene monomer component) in the statistical copolymer to be polymerized under this production condition is 0.1, the mass ratio (unsaturated nitrile monomer/chloroprene monomer) to be added is limited at maximum to 0.1. Nevertheless, it is preferable economically to use only the chloroprene monomer in view of costs for residual monomer recovery and the like.

While time $t(n)$ and time period $dt(n)$ may be set arbitrarily, $dt(n)$ is preferably 3000 seconds or less for the purpose of efficient continuous portionwise addition.

The method for calculating the total quantity of the polymerization conversion quantity of the chloroprene monomer and the unsaturated nitrile monomer during time period $dt(n)$ is not limited particularly. For example, based on the chloroprene monomer quantity and the unsaturated nitrile monomer quantity at time $t(n-1)$, the chloroprene monomer quantity and the unsaturated nitrile monomer quantity at time $t(n)$ and the quantity of the chloroprene monomer added during time period $dt(n)$, gas chromatography is used to obtain the total quantity of the polymerization conversion quantity of each of the chloroprene monomer and the unsaturated nitrile monomer. Also from the specific gravity of the polymerization fluid, the total quantity of the polymerization conversion quantity of each of the chloroprene monomer and the unsaturated nitrile monomer can be obtained by taking the specific gravities of the chloroprene monomer and the unsaturated nitrile monomer into consideration.

The procedure for determining the quantity of the chloroprene monomer to be added during time period dt(n+1) based on the aforementioned total quantity of the polymerization conversion quantity is not limited particularly. For example, calculation is made so that the ratio between the sum of the quantity of the chloroprene monomer quantity at time t(n) and the quantity of the chloroprene monomer added during time period dt(n+1) and the quantity of the unsaturated nitrile monomer at time t(n) becomes identical to the ratio between the quantity of the chloroprene monomer and the quantity of the unsaturated nitrile monomer at time t(0).

Nextly, another example of the method for conducting continuous addition of the chloroprene monomer is described while exemplifying a case using an acrylonitrile monomer as an unsaturated nitrile monomer.

The production method of the present embodiment determines the quantity of the chloroprene monomer to be added during time period dt(n+1) between time t(n) and time t(n+1) based on refrigerant calorimetric change Q(n) during time period dt(n) between time t(n−1) and time t(n) wherein the time at which the polymerization reaction is initiated is t (0) and n is an integer of 1 or more. The aforementioned refrigerant is used to cool reaction vessels for the purpose of eliminating reaction heat.

Firstly, total calorie $Qp_{(n)}$ defined as a summed value of polymerization exothermic quantity $q_{CP+AN(n)}$ [kcal] and calorimetric change $Q_{portionwise\ addition\ CP(n)}$ [kcal] of the chloroprene monomer added portionwise during time period dt(n) is in proportion with the cumulative value of refrigerant calorimetric change $Q_{(n)}$, and can be represented by Formula (II) shown below. In Formulae, "CP" denotes chloroprene, and "AN" denotes acrylonitrile.

$$Qp_{(n)} = \sigma \times Q_{(n)} \qquad (II)$$

Here, the value σ may vary depending on the polymerization formulation or the production condition, and can be determined for example by conducting the following experiment.
(Experimental Method)

In a polymerization in which the entire amount of chloroprene monomer is input initially at once, at least 3 points of integrated value $\int Q_{(n)} dt$ of refrigerant calorimetric change $Q_{(n)}$ and integrated value $\int q_{cp}(n) dt$ of the polymerization exothermic quantity at an arbitrary polymerization rate are plotted, and σ can obtained from the slope of the approximation line obtained by least square method.

In case of conducting polymerization of 16.0 [kg] of the chloroprene monomer, the total calorie was 1024 [kcal] when the polymerization rate was 35% and refrigerant calorimetric change $Q_{(n)}$ was 1362 [kcal], the total calorie was 1463 [kcal] when the polymerization rate was 50% and refrigerant calorimetric change $Q_{(n)}$ was 1922 [kcal] and the total calorie was 1902 [kcal] when the polymerization rate was 65% and refrigerant calorimetric change $Q_{(n)}$ was 2511 [kcal], and consequently, based on the slope of the resultant approximation line, the σ was 1.32.

Temperature change calorie $Q_{portionwise\ addition\ cp(n)}$ [kcal] of the chloroprene monomer added portionwise during time period dt(n) can be determined by Formula (III) shown below using specific heat of the chloroprene monomer ($\gamma_{cp}$) 0.385 [kcal/(kg K)], quantity of the chloroprene monomer added portionwise $W_{portionwise\ addition\ cp(n)}$[kg], measured value of inner temperature of the polymerization chamber $T_{in(n)}$[K] and measured value of the temperature of the chloroprene monomer added portionwise $T_{portionwise\ addition\ cp(n)}$[K].

$$Q_{portionwise\ addition\ CP(n)} = \gamma_{cp} W_{portionwise\ addition\ cp(n)} (T_{portionwise\ addition\ cp(n)} - T_{in(n)}) \qquad (III)$$

Polymerization exothermic quantity $q_{(CP+AN)(n)}$ during time period dt (n) can be represented by Formula (IV) shown below based on quantity of the chloroprene monomer polymerized $\Delta_{CP(n)}$ [kg] during time period dt(n), polymerization reaction heat $\Gamma_{cp}$ of the chloroprene monomer, quantity of the acrylonitrile monomer polymerized during time $\Delta_{AN(n)}$ [kg] during time period dt(n) and polymerization reaction heat of the acrylonitrile monomer $\Gamma_{AN}$.

While $\Gamma_{cp}$ and $\Gamma_{AN}$ are not limited particularly, they may be values included in known reference materials or may be determined by experiments. As used herein, $\Gamma_{cp}$ of 183 [kcal/kg] (Acta Chem. Stand., 4, 126(1950)) and $\Gamma_{AN}$ of 343 [kcal/kg] (J. Polym, Sci., 56, 313(1962)) from the citations are employed.

$$q_{(CP+AN)(n)} = 183\Delta_{CP(n)} + 343\Delta_{AN(n)} \qquad (IV)$$

From the ratio between the chloroprene monomer and the acrylonitrile monomer at the time of polymerization initiation and the reactivity ratios r1=14.75, r2=0.014 when assuming that the chloroprene monomer is M1 defined in Mayo-Lewis equation shown below (the Formula (I)), an acrylonitrile binding rate a [wt %] in the statistical copolymer generated during time period dt(n) can be obtained. In the production method of the present embodiment, by controlling the quantity of the chloroprene monomer to be added during time period DT(n+1) $W_{portionwise\ addition\ CP(n)}$, it became possible to keep a constant during the polymerization.

Among quantity of the chloroprene monomer to be added $W_{portionwise\ addition\ CP(n)}$ during time period dt(n), quantity of the chloroprene monomer polymerized $\Delta_{CP(n)}$, quantity of the acrylonitrile monomer $\Delta_{AN(n)}$, quantity of the chloroprene monomer $R_{CP(n+1)}$ in the polymerization system, and quantity of acrylonitrile monomer $R_{AN(n+1)}$ during time period dt(n+1), Formulae (V) and (VI) shown below hold.

$$R_{CP(n+1)} = R_{CP(n)} - \Delta_{CP(n)} + W_{portion\ wise\ addition\ CP(n)} \qquad (V)$$

$$R_{AN(n+1)} = R_{AN(n)} - \Delta_{AN(n)} \qquad (VI)$$

Quantity of the chloroprene monomer to be added $W_{portionwise\ addition\ CP(n+1)}$ during time period dt(n+1) is now determined based on Formula (VII) shown below so that $R_{CP(0)}/R_{AN(0)} = R_{CP(1)}/R_{AN(1)} = R_{CP(n)}/R_{AN(n)} = R_{CP(n+1)}/R_{AN(n+1)}$ holds.

$$R_{CP(0)}/R_{AN(0)} = \{R_{CP(n)} - \Delta_{CP(n)} + W_{portionwise\ addition\ CP(n+1)}\}/\{R_{AN(n)} - \Delta_{AN(n)}\} \qquad (VII)$$

Thus, Formula (VIII) shown below holds.

$$W_{portionwise\ addition\ CP(n+1)} = R_{CP(0)}/R_{AN(0)} (R_{AN(n)} - \Delta_{AN(n)}) - (R_{CP(n)} - \Delta_{CP(n)}) \qquad (VIII)$$

Here, quantity of the chloroprene monomer $\Delta_{CP(n)}$ and quantity of the acrylonitrile monomer $\Delta_{AN(n)}$ polymerized during time period dt(n) can be obtained by Formulae (IX) and (X) shown below using actually measurable refrigerant calorimetric change Q(n) and temperature change calorie $Q_{portionwise\ addition\ CP(n)}$ of the chloroprene monomer added portionwise during time period dt(n).

$$\Delta_{CP(n)} = (100/\alpha - 1)(\sigma Q_{(n)} - Q_{portionwise\ addition\ CP(n)})/\{343 + 183(100/\alpha - 1)\} \quad (IX)$$

$$\Delta_{AN(n)} = (\sigma Q_{(n)} - Q_{portion\ wise\ addition\ CP(n)})/\{343 + 183(100/\alpha - 1)\} \quad (X)$$

$\Delta_{AN(n)}$ and $\Delta_{CP(n)}$ obtained by the aforementioned Formulae (IX) and (X) are substituted to obtain $W_{portionwise\ addition\ CP(n+1)}$, and the electromagnetic valve aperture was set so that the flow rate of the chloroprene monomer during the continuous addition became $W_{portionwise\ addition\ CP(n+1)}/dt$.

Nextly, one example of the method for conducting 10 cycles or more of intermittent portionwise addition of the chloroprene monomer is described.

When conducting the intermittent portionwise addition, a method similar to the aforementioned continuous portionwise addition can be employed. Specifically, by setting time period dt(n) longer, setting chloroprene monomer addition rate higher and completing the addition of the chloroprene monomer during time period dt(n+1) before time period dt(n+1) elapses, the chloroprene monomer can intermittently be added. This chloroprene monomer addition may be repeated 10 cycles or more.

Time period dt(n) is preferably 0.1 to 3000 seconds. The chloroprene monomer addition rate is preferably 2 parts by mass/minute or less based on 100 parts by mass as a total of the chloroprene monomer and the unsaturated nitrile monomer.

Nextly, another example of the method for conducting intermittent portionwise addition is described.

When conducting the intermittent portionwise addition, in the case that the mass ratio between the unsaturated nitrile monomer and the total of unreacted chloroprene monomer and unsaturated nitrile monomer in the polymerization fluid is kept at 0.50, the production method of the present embodiment preferably comprises, after initiation of the polymerization reaction, (1) a step for calculating the polymerization rate of the chloroprene monomer and the unsaturated nitrile monomer based on the specific gravity of a latex containing the chloroprene monomer and the unsaturated nitrile monomer, (2) a step for calculating the unreacted chloroprene monomer quantity and the unreacted unsaturated nitrile monomer quantity based on the polymerization rate and (3) a step, at the time point when the difference between the unreacted chloroprene monomer quantity and the unreacted unsaturated nitrile monomer quantity becomes identical to a scheduled portionwise addition quantity which is a quantity obtained by dividing the total quantity of the chloroprene monomer scheduled to be added in the intermittent portionwise addition by the number of portionwise addition cycles, for conducting portionwise addition of the chloroprene monomer in the scheduled portionwise addition quantity to the latex.

In this method, for the purpose of calculating the polymerization rate in the aforementioned step (1), it is preferable to include a step for obtaining a correlation between the specific gravity of the latex and the polymerization rate of the chloroprene monomer and the unsaturated nitrile monomer by a preliminary test.

The aforementioned preliminary test can be conducted for example by the following procedure. In the example shown below, a description is made while exemplifying a case in which an acrylonitrile monomer is employed as an unsaturated nitrile monomer.

It is assumed that the input monomer ratio is acrylonitrile monomer/chloroprene monomer=a/b, the number of portionwise addition cycles is n cycle, the quantity of the chloroprene monomer per cycle of portionwise addition is m parts by mass based on 100 parts by mass as a total quantity of the acrylonitrile monomer and the chloroprene monomer, and, at specific gravity r, the residual acrylonitrile monomer quantity is $C_{rAN}$ parts by mass and the residual chloroprene monomer quantity is $C_{rCP}$ parts by mass. An initial input monomer was polymerized, the relationship between r and $C_{rAN}$, $C_{rCP}$ is verified, and a portionwise addition specific gravity $R_{b1}$ giving Formula (XI) shown below was determined. Subsequently, the initial input monomer was polymerized similarly until reaching the specific gravity $R_{b1}$ and thereafter, m parts by mass of the chloroprene monomer was added, and the relationship between r and $C_{rAN}$, $C_{rCP}$ is verified, and a portionwise addition specific gravity $R_{b2}$ giving Formula (XI) shown below was determined. n Cycles of similar process were conducted thereby determining the portionwise addition specific gravity until completion of the polymerization.

[Equation 2]

$$C_{rAN} * \frac{b}{a} - C_{rCP} = m \quad (XI)$$

In the production method of the present embodiment, when conducting 10 cycles or more of intermittent portionwise addition, the quantity of the chloroprene monomer added per cycle after polymerization initiation reaction is preferably 10 parts by mass or less based on 100 parts by mass as a total of the chloroprene monomer and the unsaturated nitrile monomer. In case of an intermittent portionwise addition, it is preferable to set the addition rate to 2 parts by mass/minute or less. This range allows a statistical copolymer having excellent oil resistance and mechanical strength to be obtained.

The production method of the present embodiment can contain, in the chloroprene monomer or the unsaturated nitrile monomer employed, one or two or more of other monomers. While the monomers employed in the present embodiment are not limited particularly as long as the effects of the present invention are not affected adversely, they may for example be 2,3-dichloro-1,3-butadiene, 1-chloro-1,3-butadiene, sulfur, methyl methacrylic acid and its salts, ethyl methacrylic acid and its salts, propyl methacrylic acid and its salts (all isomers), butyl methacrylic acid and its salts (all isomers), 2-ethyl hexyl methacrylic acid and its salts, isobornyl methacrylic acid and its salts, methacrylic acid and its salts, benzyl methacrylic acid and its salts, phenyl methacrylic acid and its salts, ethyl acrylic acid and its salts, propyl acrylic acid and its salts (all isomers), butyl acrylic acid and its salts (all isomers), 2-ethyl hexyl acrylic acid and its salts, isobornyl acrylic acid and its salts, acrylic acid and its salts, benzyl acrylic acid and its salts, phenyl acrylic acid and its salts, styrene, and glycidyl methacrylic acid and its salts, 2-hydoxyethyl methacrylic acid and its salts, hydoxypropyl methacrylic acid and its salts (all isomers), hydoxybutyl methacrylic acid and its salts (all isomers), N,N-dimethylaminoethyl methacrylic acid and its salts, N,N-diethylaminoethyl methacrylic acid and its salts, triethylene glycol methacrylic acid and its salts, itaconic anhydride and its salts, itaconic acid and its salts, glycidyl acrylic acid and its salts, 2-hydoxyethyl acrylic acid and its salts, hydoxypropyl acrylic acid and its salts (all isomers), hydoxybutyl acrylic acid and its salts (all isomers), N,N-dimethylaminoethyl acrylic acid and its salts, N,N-diethylaminoethyl acrylic acid and its salts, triethylene glycol acrylic acid and its salts, methacrylamide, N-methyl acrylamide, N,N-dimethyl acrylamide, N-butyl methacrylamide (all isomers), N-methylolmethacrylamide, N-ethylolmethacrylamide, N-butyl acrylamide (all isomers), N-methylol acrylamide, N-ethylol acrylamide, vinyl benzoic acid and its salts (all isomers), diethylaminostyrene (all isomers), alpha-ethyl vinyl benzoic acid (all isomers), diethylamino alpha-methyl styrene (all isomers), p-vinylbenzene sulfonic acid and its salts, p-vinylbenzene sodium sulfonate, trimethoxysilylpropyl methacrylic acid and its salts, triethoxysilylpropyl methacrylic acid and its salts, tributoxysilylpropyl methacrylic acid and its salts, dimethoxymethyl silylpropyl methacrylic acid and its salts, diethoxymethyl silylpropyl methacrylic acid and its salts, dibutoxymethyl silylpropyl methacrylic acid and its salts, diisopropoxymethyl silylpropyl methacrylic acid and its salts, dimethoxyethyl silylpropyl methacrylic acid and its salts, diethoxyethyl silylpropyl methacrylic acid and its salts, dibutoxyethyl silylpropyl methacrylic acid and its salts, diisopropoxyethyl silylpropyl methacrylic acid and its salts, trimethoxysilylpropyl acrylic acid and its salts, triethoxysilylpropyl acrylic acid and its salts, tributoxysilylpropyl acrylic acid and its salts, dimethoxymethyl silylpropyl acrylic acid and its salts, diethoxymethyl silylpropyl acrylic acid and its salts, dibutoxymethyl silylpropyl acrylic acid and its salts, diisopropoxymethyl silylpropyl acrylic acid and its salts, dimethoxysilylpropyl acrylic acid and its salts, diethoxysilylpropyl acrylic acid and its salts, dibutoxysilylpropyl acrylic acid and its salts, diisopropoxysilylpropyl acrylic acid and its salts, vinyl acetate, vinyl butyrate, vinyl benzoate, vinyl chloride, vinyl fluoride, vinyl bromide, maleic anhydride, N-phenyl maleimide, N-butyl maleimide, N-vinylpyrrolidone, N-vinylcarbazol, butadiene, isoprene, ethylene, propylene and the like. In such a case, the monomer content of the chloroprene monomer or the unsaturated nitrile monomer may also be 20 parts by mass or less in total, although they are not limited particularly as long as the effects of the present inventions are not affected adversely.

The unsaturated nitrile monomer employed in the production method of the present embodiment may for example be acrylonitrile, methacrylonitrile, ethacrylonitrile, phenyl acrylonitrile and the like, only one of which or a combination of two or more can be employed. Among those listed above, acrylonitrile is preferable from the viewpoints of easy production and oil resistance.

The emulsifying/dispersing agent employed in the emulsion polymerization is not limited particularly, and those of various types employed in an ordinary chloroprene emulsion polymerization such as those of anionic types, nonionic types and cationic types can be employed. On the basis of the stability of the resultant latex, anionic type emulsifiers are preferable, and may for example be rosin acid salts, alkyl sulfonates having 8 to 20 carbon atoms, alkylaryl sulfates, condensate of sodium naphthalene sulfonate and formaldehyde, sodium alkyldiphenyl ether disufonate and the like. Among the emulsifiers of the anionic types, it is especially preferable to use alkali metal salts of rosin acid because of the reason that it is possible to allow a statistical copolymer in a film form obtained by freeze coagulation drying after completion of the polymerization to have an appropriate strength thereby preventing excessive shrinkage and rupture. A rosin acid is a mixture of resin acids, fatty acids and the like. The resin acids include abietic acid, neoabietic acid, palustric acid, pimaric acid, isopimaric acid, dehydrabietic acid, dihydropimaric acid, dihidroisopimaric acid, secodehydroabietic acid, dihydroabietic acid and the like, and the fatty acids include oleic acid, linoleic acid and the like. These have component compositions which vary on the basis of difference in methods for collecting rosins which are classified into gum rosins, wood rosins and tall rosins, growing districts and wood types of pine trees, distillation purification and dismutation (disproportionation) reaction, and which are not limited in the present invention. When the emulsifying stability and easy handling are taken into consideration, it is preferable to use sodium salts or potassium salts. The concentration of an emulsifying/dispersing agent is preferably 0.1 to 10% by mass, more preferably 1 to 5% by mass. A concentration of 0.1% by mass or higher allows a monomer to be emulsified sufficiently, while a concentration of 10% by mass or lower enables more efficient precipitation when solidifying the aforementioned statistical copolymer.

The polymerization initiator employed in the emulsion polymerization is not limited particularly, and may for example be organic peroxides such as potassium persulfate, ammonium persulfate, sodium persulfate, hydrogen peroxide, t-butyl peroxyacetate, t-butyl peroxybenzoate, t-butyl peroxyoctoate, t-butyl peroxyneodecanoate, t-butyl peroxyisobutyrate, t-amylperoxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydosulfate, di-t-butyl hyponitrite, dicumyl hyponitrite and the like, and azo-based initiators such as 2,2-azobis(isobutyronitrile), 2,2'-azobis(2-cyano-2-butane), 2,2'-azobisdimethyl isobutyrate, 4,4'-azobis(4-cyanopentanoic acid), 1,1'-azobis (cyclohexanecarbonitrile), 2-(t-butyl azo)-2-cyanopropane, 2,2'-azobis[2-methyl-N-(1,1)-bis(hydoxymethyl)-2-hydoxyethyl]propionamide, 2,2'-azobis[2-methyl-N-hydoxyethyl)]-propionamide, 2,2'-azobis(N,N'-dimethyleneisobutyl amidine)dihydrochloride, 2,2'-azobis(2-amidinopropane)dihydrochloride, 2,2'-azobis(N,N'-dimethyleneisobutylamine), 2,2'-azobis(2-methyl-N-[1,1-bis(hydoxymethyl)-2-hydoxyethyl]propionamide), 2,2'-azobis(2-methyl-N-[1,1-bis(hydoxymethyl)ethyl] propionamide, 2,2'-azobis[2-methyl-N-(2-hydoxyethyl) propionamide], 2,2-azobis(isobutyl amide)dihydrate), 2,2'-azobis(2,2,4-trimethyl pentane), 2,2'-azobis(2-methyl propane) and the like.

In the emulsion polymerization, it is also possible to use a polymerization cocatalyst. The polymerization cocatalyst which can be employed in the present embodiment is not limited particularly as long as the effects of the present invention are not affected adversely, and one or two or more of known polymerization cocatalysts can arbitrarily be employed. For example, those which can be exemplified are L-ascorbic acid, tartaric acid, sodium hydrogen sulfite, zinc- or sodium-formaldehyde-sulfoxylate rongalit, formdiamine sulfinic acid, glucose, formalin, sodium anthraquinone ß-sulfonate, ferrous sulfate, copper sulfate, sodium bisulfite, thioirea and the like.

The production method of the present embodiment can use a chain transfer agent for controlling the molecular weight. Any known chain transfer agents including, but not particularly limited to, long chain alkylmercaptans such as n-dodecylmercaptan, t-dodecylmercaptan, n-octylmercaptan and the like, xantic compounds such as diisopropylxanthogen disulfide, diethylxanthogen disulfide and the like, thiocarbonyl compounds such as iodoform, benzyl 1-pyrroldithiocarbamate (also known as benzyl 1-pyrrolcarbodithioate), benzylphenyl carbodithioate, 1-benzyl-N,Ndimethyl-4-aminodithiobenzoate, 1-benzyl-4-methoxydithiobenzoate, 1-phenylethylimidazole dithiocarbamate (also known as 1-phenylethylimidazole carbodithioate), benzyl-1-(2-pyrrolidinone)dithiocarbamate (also known as benzyl-1-(2-pyrrolidinone)carbodithioate), benzylphthalimidyl dithiocarbamate (also known as benzylphthalimidyl carbodithioate), 2-cyanoprop-2-yl-1-pyrrol-dithiocarbamate (also known as 2-cyanoprop-2-yl-1-pyrrolcarbodithioate), 2-cyanobut-2-yl-1-pyrroldithiocarbamate (also known as 2-cyanobut-2-yl-1-pyrrolcarbodithioate), benzyl-1-imidazole dithiocarbamate (also known as benzyl-1-imidazole carbodithioate), 2-cyanoprop-2-yl-N,N-dimethyl dithiocarbamate, benzyl-N,N-diethyl dithiocarbamate, cyanomethyl-1-(2-pyrrolidone)dithiocarbamate, 2-(ethoxycarbonylbenzyl)prop-2-yl-N,N-diethyl dithiocarbamate, 1-phenyl ethyl dithiobenzoate, 2-phenylprop-2-yldithiobenzoate, 1-aceto-1-yl-ethyl dithiobenzoate, 1-(4-methoxyphenyl)ethyl dithiobenzoate, benzyl dithioacetate, ethoxycarbonylmethyl dithioacetate, 2-(ethoxycarbonyl)prop-2-yldithiobenzoate, 2-cyanoprop-2-yldithiobenzoate, t-butyl dithiobenzoate, 2,4,4-trimethylpenta-2-yldithiobenzoate, 2-(4-chlorophenyl)-prop-2-yldithiobenzoate, 3-vinylbenzyl dithiobenzoate, 4-vinylbenzyl dithiobenzoate, benzyl diethoxyphosphinyl dithioformate, t-butyltrithioperbenzoate, 2-phenylprop-2-yl-4-chlorodithiobenzoate, naphthalene-1-carboxylic acid 1-methyl-1-phenyl-ethyl ester, 4-cyano-4-methyl-4-thiobenzyl sulfanyl butyric acid, dibenzyl tetrathioterephthalate, carboxymethyl dithiobenzoate, dithiobenzoate terminal-carrying poly(ethylene oxide), 4-cyano-4-methyl-4-thiobenzylsulfanyl butyrate terminal-carrying poly(ethylene oxide), 2-[(2-phenylethanethioyl)sulfanyl]propanoic acid, 2-[(2-phenylethanethioyl)sulfanyl]succinic acid, potassium 3,5-dimethyl-1H-pyrazol-1-carbodithioate, cyanomethyl-3,5-dimethyl-1Hpyrazol-1-carbodithioate, cyanomethyl methyl-(phenyl) dithiocarbamate, benzyl-4-chlorodithiobenzoate, phenyl methyl-4-chlorodithiobenzoate, 4-nitrobenzyl-4-chlorodithiobenzoate, phenyl prop-2-yl-4-chlorodithiobenzoate, 1-cyano-1-methyl ethyl-4-chlorodithiobenzoate, 3-chloro-2-butenyl-4-chlorodithiobenzoate, 2-chloro-2-butenyl dithiobenzoate, benzyl dithioacetate, 3-chloro-2-butenyl-1Hpyrrol-1-dithiocarboxylic acid, 2-cyanobutane-2-yl-4-chloro-3, 5-dimethyl-1H-pyrazol-1-carbodithioate, cyanomethyl methyl(phenyl)carbamodithioate, 2-cyano-2-propyldodecyl trithiocarbonate, dibenzyl trithiocarbonate, butylbenzyl trithiocarbonate, 2-[[(butylthio)thioxomethyl]thio]propionic acid, 2-[[(dodecylthio)thioxomethyl]thio]propionic acid, 2-[[(butylthio)thioxomethyl]thio]succinic acid, 2-[[(dodecylthio)thioxomethyl]thio]succinic acid, 2-[[(dodecylthio)thioxomethyl]thio]-2-methyl propionic acid, 2,2'-[carbonothioylbis(thio)]bis[2-methyl propionic acid], 2-amino-1-methyl-2-oxoethylbutyl trithiocarbonate, benzyl-2-[(2-hydoxyethyl)amino]-1-methyl-2-oxoethyl trithiocarbonate, 3-[[[(t-butyl)thio]thioxomethyl]thio]propionic acid, cyanomethyldodecyl trithiocarbonate, diethylaminobenzyl trithiocarbonate, dibutylaminobenzyl trithiocarbonate and the like can be employed. Among these, a xanthic compound is preferably added. In the chloroprene-acrylonitrile copolymer production method described in the aforementioned Patent Document 2, a mercaptan compound is employed as a chain transfer agent and a viscous by-product is formed due to a thiol-ene reaction, because of which an operation to remove this by-product is required. On the contrary, addition of a xanthic compound as a chain transfer agent serves to suppress the formation of the by-product, thereby eliminating the need of the operation to remove the by-product, resulting in an increased production efficiency of the statistical copolymer.

In addition, a xanthic compound allows a statistical copolymer having a high crosslinking density when vulcanized to be obtained since it has a higher reactivity when compared with other chain transfer agents. This high crosslinking density is considered to contribute to an improved oil resistance of the statistical copolymer.

The xanthic compound may for example be dialkyl xanthogen disulfides such as dimethylxanthogen disulfide, diethylxanthogen disulfide, diisopropylxanthogen disulfide, dibutylxanthogen trisulfide and the like. Those which can also be exemplified are dialkylxanthogen trisulfides such as diethylxanthogen trisulfide, diisopropylxanthogen trisulfide, dibutylxanthogen trisulfide and the like. Those which can also be employed are dialkylxanthogens having 4 or more sulfur atoms via which xanthogens are linked such as dialkylxanthogen polysulfides including diethylxanthogen polysulfide, diisopropylxanthogen polysulfide, dibutylxanthogen polysulfide and the like. The number of carbon atoms of the alkyl group of these dialkylxanthogen sulfide compounds is preferably 1 to 10 in view of solubility in the chloroprene monomer, more preferably 1 to 6.

While the quantity of a chain transfer agent to be added is not limited particularly, it is preferably 0.002 to 20 parts by mass based on 100 parts by mass as a total of the chloroprene monomer and the unsaturated nitrile monomer. This range allows the polymerization reaction to be controlled easily.

While the polymerization temperature in the emulsion polymerization is not limited particularly, it is preferably κ to 59° C., more preferably 5 to 55° C. A polymerization temperature of 5° C. or higher serves to prevent the thickening of the emulsified fluid thereby further improving the efficiency of the initiator. Also since the boiling point of chloroprene at normal pressure is about 59° C., a polymerization temperature of 55° C. or less serves to avoid a sudden bumping of the reaction fluid due to insufficient heat removal in case of accidental heat generation resulting from abnormal polymerization and the like. More preferably, the polymerization temperature is kept at 5 to 20° C., which allows a statistical copolymer containing a chloroprene monomer unit and an unsaturated nitrile monomer unit having excellent mechanical characteristics to be obtained.

While the final polymerization rate in the emulsion polymerization is not limited particularly, it is preferably 80% or less in order to prevent gelation. Also in some case a certain quantity of a gel is produced intentionally for the purpose of modifying the statistical copolymer containing a chloroprene monomer unit and an unsaturated nitrile monomer unit, and in such a case the polymerization rate is not limited particularly, although it is 70% or higher, more preferably 80% or higher from the viewpoint of economic efficiency. For example, a latex of the statistical copolymer containing a chloroprene monomer unit and an unsaturated nitrile monomer unit having a high gel portion is excellent in terms of mechanical strength, heat resistance and chemical resistance. Also, a composition containing a statistical copolymer containing a chloroprene monomer unit and an unsaturated nitrile monomer unit containing a gel portion is excellent in terms of dimension stability during sheeting fabrication and discharge performance during extruding fabrication. Adjustment of the polymerization rate can be accomplished by adding polymerization inhibitor to stop the polymerization reaction. The polymerization inhibitor is not limited particularly, and may for example be oil-soluble polymerization inhibitors such as thiodiphenylamine, 4-tertiary-butylcatechol, 2,2-methylenebis-4-methyl-6-tertiary-butylphenol as well as water-soluble polymerization inhibitors such as diethyl hydoxylamine and the like.

The unreacted monomer may be removed by known methods such as heating under reduced pressure. Thereafter, pH is adjusted, and then, via steps of freeze coagulation, washing with water, hot air drying and the like, the statistical copolymer in the form of a solid may be recovered.

An Example of the aforementioned Patent Document 3 meanwhile describes a chloroprene copolymer produced by simultaneous addition of monomers such as a chloroprene monomer or an acrylonitrile monomer. In this Example, the oil resistance of a vulcanized material of the chloroprene copolymer is evaluated by measuring the volume increase rate (%) after immersing the vulcanized material for 72 hours in an oil at 100° C. In Table 3 of the Patent Document 3, it is indicated that the oil resistance of the vulcanized material is 45.0% or higher.

On the other hand, a vulcanized material containing a statistical copolymer exhibited the results of the oil resistance test which were 19% and 5%, as shown in Examples described below. In the oil resistance test of this Example, the volume increase rate (%) after immersing the vulcanized material for 72 hours in an oil at 135° C. is measured. The oil resistance test of this Example allowed, in spite of the severe condition involving the oil temperature higher than that in Patent Document 3, the volume increase rate in this Example to be lower significantly.

<2. Statistical Copolymer>

The second embodiment is a statistical copolymer containing a chloroprene monomer unit and an unsaturated nitrile monomer unit having a specific composition. While the statistical copolymer containing a chloroprene monomer unit and an unsaturated nitrile monomer unit of the present embodiment can be obtained by the aforementioned production method, this production method is not limitative.

The unsaturated nitrile binding level of the statistical copolymer is preferably 5 to 40% by mass. Within this range, it is possible to obtain a statistical polymer which is preferable for obtaining a vulcanized rubber having practically useful oil resistance and mechanical strength. The unsaturated nitrile binding level of the statistical copolymer is more preferably 8 to 20% by mass, and, additionally from the viewpoint of low temperature characteristics, further preferably 8 to 17% by mass. An unsaturated nitrile binding level of 20% by mass, or exceeding 17% by mass may result in a reduction in the low temperature characteristics (low temperature compression set) of the statistical copolymer. Especially from the viewpoint of especially excellent oil resistance and dynamic properties of the vulcanized rubber, 12 to 20% by mass is preferable, and, additionally from the viewpoint of low temperature characteristics, 12 to 17% by mass is more preferable. On the other hand, from the viewpoint of an excellent oil resistance and an especially excellent low temperature characteristics (low temperature compression set) both being achieved simultaneously, 8 to 12% by mass is preferable.

While the number average molecular weight (Mn) of the statistical copolymer is not limited particularly, it is preferably within the range from 80,000 to 300,000. Less than 80,000 may deteriorate the dynamic properties of the vulcanized molded article, while more 300,000 may deteriorate the molding workability of the resultant rubber composition. Similarly, the molecular weight distribution, i.e., weight average molecular weight/number average molecular weight (Mw/Mn) is not limited particularly, and may generally be within the range from 1.5 to 5.0.

The statistical copolymer of the present embodiment may for example be chloroprene-acrylonitrile statistical copolymer, chloroprene-methacrylonitrile statistical copolymer, chloroprene-ethacrylonitrile statistical copolymer, chloroprene-phenyl acrylonitrile statistical copolymer and the like. Among those listed above, from the viewpoints of easy production, oil resistance and, mechanical strength, chloroprene-acrylonitrile statistical copolymer is preferable.

A statistical copolymer of the present embodiment is a statistical copolymer containing a chloroprene monomer unit and an unsaturated nitrile monomer unit characterized in that it enables that, when a vulcanized rubber prepared in accordance with the sample preparation condition (I) is evaluated, the oil resistance to IRM903 oil measured in accordance with JIS K6258 is preferably ΔW<+15%, more preferably fulfills the condition of ΔV<+20% or less, the compression set after 72 hours at 0° C. measured in accordance with JIS K 6262 is 25% or less, more preferably 20% or less, and the flex fatigue resistance at 40° C. measured in accordance with JIS K 6260 is 100,000 cycles or more. In addition, the statistical copolymer according to the present embodiment enables that, when a vulcanized rubber prepared in accordance with the sample preparation condition (I) is evaluated, the mechanical characteristics measured in accordance with JIS K6251 include a tensile strength at break >20 MPa and an elongation at break >300%.

(Sample Preparation Condition (I))

100 Parts by mass of the statistical copolymer, 2 parts by mass of 4,4'-bis(α,α-dimethylbenzyl) diphenylamine (for example, "Nocrak CD" manufactured by OUCHI SHINKO CHEMICAL INDUSTRIAL CO., LTD.), 4 parts by mass of magnesium oxide (for example, "KYOWAMAG #150" manufactured by Kyowa Chemical Industry Co., Ltd.), 50 parts by mass of a carbon black (for example, SRF; "ASAHI #50" manufactured by ASAHI CARBON CO., LTD.), 5 parts by mass of a polyether ester-based plasticizer (for example, "Adekacizer RS-735" manufactured by ADEKA CORPORATION), 5 parts by mass of zinc oxide (for example, manufactured by SAKAI CHEMICAL INDUSTRY CO., LTD.), 1.5 parts by mass of ethylene thiourea (for example, "ACCEL 22S" manufactured by Kawaguchi Chemical Industry Co., LTD.) and 1 part by mass of N-phenyl-N'-(1,3-dimethylbutyl)-p-phenylenediamine (for example, "Nocrak 6C" manufactured by OUCHI SHINKO CHEMICAL INDUSTRIAL CO., LTD.) are kneaded for 20 minutes using an 8-inch roll whose cooling water temperature is set at 40° C. to obtain a rubber composition. The resultant rubber composition is subjected to a heat treatment based on JIS K 6250 using an electric heat press at 170° C. for 20 minutes followed by entry into heated air at 170° C. for 2 hours, thereby preparing a vulcanized rubber.

<3. Latex>

A latex according to the third embodiment is a latex containing a statistical copolymer containing a chloroprene monomer unit and an unsaturated nitrile monomer unit having a specific composition. In addition, this latex includes a latex containing the aforementioned statistical copolymer produced by the emulsion polymerization described in the section of the production method of the aforementioned statistical copolymer. It is preferable that the unreacted monomer contained in the latex after polymerization reaction is removed by a known method such as heating under reduced pressure.

The latex of the present embodiment preferably has a solid concentration in the entire quantity of the latex of 30 to 70% by mass. Within this range, a latex suitable for manufacturing and having an excellent storage stability can be obtained. While the method for measuring the solid concentration is not limited particularly, calculation can be made from the change in mass before and after drying a latex containing a statistical copolymer for 3 hours using a hot air drier.

The latex of the present embodiment is used preferably in adhesives and dip products (See Patent Documents 6 and 7, Non-patent Document 1). Rubber latexes including natural rubbers and synthetic rubbers such as CR, IR (isoprene rubber), NBR and the like are employed as starting materials for dip molding products such as medical surgical gloves, laboratory gloves, industrial gloves, balloons, catheters, rubber boots, reinforcing fiber and the like. Especially in the rubber latexes for the medical surgical gloves, the laboratory gloves, the industrial gloves and the household gloves, synthetic rubbers such as CR, IR, NBR and the like are favorable for avoiding the problems of allergy-induced shock symptoms (anaphylaxis) attributable to the natural rubbers. Among these, CR gloves are adopted in food plants and machine plants because they have well-balanced pliability and mechanical strength and exhibit a high oil resistance. While thin gloves are increasingly demanded in these days from the viewpoints of operability, accompanying problems are experienced such as reduction in the strength and the oil resistance. Also, for the purpose of reducing the allergy attributable to vulcanization accelerators, development of vulcanization accelerator-free gloves is advanced, but also involves technically problematic reduction in the strength and the oil resistance. Also, in RFL which was surface-treated by immersion of reinforcing fibers in order to enhance adhesiveness to rubbers, CR is employed. When used in belts for which the reinforcing fibers are intended to be used, the mechanical strength and the oil resistance are increasingly demanded as described above. Therefore, development of a polychloroprene latex exhibiting further excellent mechanical strength and oil resistance is strongly desired. Since the present latex contains the aforementioned statistical copolymer, it is capable of increasing the mechanical strength and oil resistance of adhesives and dip products. Accordingly, it is possible to produce more excellent adhesives and dip products when compared with conventional CR.

<4. Rubber Composition>

A rubber composition according to the fourth embodiment contains a statistical copolymer containing a chloroprene monomer unit and an unsaturated nitrile monomer unit having a specific composition. The statistical copolymer contained in the rubber composition may be one obtained by dehydrating the aforementioned latex followed by drying. In a rubber composition of the present embodiment, starting materials other than the statistical copolymer are not limited particularly, and selected appropriately depending on purpose and use. The starting materials capable of being contained in the rubber composition may for example be vulcanizing agents, vulcanization accelerators, fillers or reinforcing agents, plasticizers, processing aids, glidants, anti-aging agents, silane coupling agents and the like.

While the vulcanizing agents capable of being added are sulfur, thiourea-based, guanidine-based, thiuram-based, thiazole-based organic vulcanizing agents employed generally for vulcanizing chloroprene rubbers, thiourea-based agents are preferable. The thiourea-based vulcanizing agents may for example be ethylene thiourea, diethylthiourea, trimethylthiourea, triethylthiourea, N,N'-diphenylthiourea and the like, and trimethylthiourea and ethylene thiourea are especially preferred. Those which can also be used are vulcanizing agents such as 3-methyl thiazolidinethion, dimethyl ammonium hydrogen isophthalate or 1,2-dimercapto-1,3,4-thiadiazole derivatives, N-cyclohexylthiophthalimide and the like. As such vulcanizing agents, two or more of those listed above may be employed concomitantly. Elemental metals such as beryllium, magnesium, zinc, calcium, barium, germanium, titanium, tin, zirconium, antimony, vanadium, bismuth, molybdenum, tungsten, tellurium, selenium, iron, nickel, cobalt, osmium and the like, and oxides and hydroxides of these metals can also be employed as vulcanizing agents. Among these vulcanizing agents capable of being added, calcium oxide, zinc oxide, antimony dioxide, antimony trioxide and magnesium oxide are especially preferred because of their high vulcanizing effect. It is also possible to use a combination of two or more of these vulcanizing agents. The vulcanizing agents are added preferably in an amount within the range from 0.1 parts by mass or more and 10 parts by mass or less in total to 100 parts by mass of the rubber component.

While the fillers or the reinforcing agents are added in order to adjust the hardness of a rubber or to improve the mechanical strength and not limited particularly, those which can be exemplified are furnace carbon black such as SAF, ISAF, HAF, EPC, XCF, FEF, GPF, HMF, SRF and the like, modified carbon black such as hydrophilic carbon black, thermal carbon such as channel black, lamp black, FT, MT and the like, acethylene black, Ketjenblack, silica, clay, talc, calcium carbonate and the like. Other inorganic fillers which may be used include, but not limited particularly to, alumina ($Al_2O_3$) such as γ-alumina and α-alumina and the like, alumina monohydrate ($Al_2O_3H_2O$) such as boehmite and diaspore and the like, aluminum hydroxide [$Al(OH)_3$] such as gibbsite and bayerite and the like, aluminum carbonate [$Al_2(CO_3)_2$], magnesium hydroxide [$Mg(OH)_2$], magnesium carbonate ($MgCO_3$), talc ($3MgO\ 4SiO_2\ H_2O$), attapulgite ($5MgO\ 8SiO_2\ 9H_2O$), titanium white ($TiO_2$), titanium black ($TiO_{2n}-1$), calcium oxide (CaO), calcium hydroxide [$Ca(OH)_2$], magnesium aluminum oxide ($MgO\ Al_2O_3$), clay ($Al_2O_3\ 2SiO_2$), kaolin ($Al_2O_3\ 2SiO_2\ 2H_2O$), pyrophyllite ($Al_2O_3\ 4SiO_2\ H_2O$), bentonite ($Al_2O_3\ 4SiO_2\ 2H_2O$), aluminum silicate ($Al_2SiO_5$, $Al_4\ 3SiO_4\ 5H_2O$ and the like), magnesium silicate ($Mg_2SiO_4$, $MgSiO_3$ and the like), calcium silicate ($Ca_2SiO_4$ and the like), calcium aluminum silicate ($Al_2O_3CaO\ 2SiO_2$ and the like), calcium magnesium silicate ($CaMgSiO_4$), calcium carbonate ($CaCO_3$), zirconium oxide ($ZrO_2$), zirconium hydroxide [$ZrO(OH)_2\ nH_2O$], zirconium carbonate [$Zr(CO_3)_2$], hydrotalcite, crystalline aluminosilicate containing hydrogen which corrects electric charge as well as alkali metal or alkali earth metal such as various zeolites and the like. Only one or a combination of two or more of the fillers and the reinforcing agents may be employed. While the quantity of these fillers and reinforcing agents to be incorporated may be adjusted depending on the properties required in the rubber composition or the vulcanized molded article thereof and is not limited particularly, it is usually within the range of 15 parts by mass or more and 200 parts by mass or less in total to 100 parts by mass of the rubber component in the rubber composition of the present embodiment.

The plasticizers are not limited particularly as long as they are plasticizers compatible with rubbers, and may for example be vegetable oils such as rapeseed oils, linseed oils, castor oils, palm oils and the like, phthalate-based plasticizers, DUP (undecyl phthalate), DOP (dioctyl phthalate), DINP (diisononyl phthalate), DOTP (dioctyl terephthalate), DOS (dioctyl sebacate), DBS (dibutyl sebacate), DOA (dioctyl adipate), DINCH (diisononyl 1,2-cyclohexane dicarboxylate), TOP (trioctyl phosphate), TBP (tributyl phosphate), ester-based plasticizers, ether ester-based plasticizers, thioether-based plasticizers, aromatic oils, petroleum-based plasticizers such as naphthene-based oils, lubricants, process oils, paraffin, liquid paraffin, vaseline, petroleum asphalt and the like, one or multiple of which can be employed depending on the characteristics required in the rubber composition of the present embodiment or the vulcanized molded article of this composition. The quantity of the plasticizers to be incorporated is not limited particularly, it is usually within the range of 5 parts by mass or more and 50 parts by mass or less in total to 100 parts by mass of the rubber component in the rubber composition of the present embodiment.

The processing aids and the glidants which are added to improve fabrication characteristics and surface smoothness aiming for example at easy release from rolls, molds and extruder screw upon kneading or vulcanizing molding of a rubber composition may for example be fatty acids such as stearic acid, or paraffin-based processing aids such as polyethylene, fatty acid amides and the like. Only one of or a combination of two or more of the processing aids and the glidants may be employed. While the quantity to be added is not limited, it is usually 0.5 parts by mass or more and 5 parts by mass or less in total to 100 parts by mass of the rubber component in the rubber composition of the present embodiment.

As anti-aging agents for improving heat resistance, those employed ordinarily in rubber, such as primary anti-aging agents which scavenge a radical to prevent spontaneous oxidation and secondary anti-aging agents which detoxify hydroperoxide can be added. Such an anti-aging agent may be added respectively at a rate of 0.1 parts by mass or more and 10 parts by mass or less, preferably within the range of 2 parts by mass or more and 5 parts by mass or less to 100 parts by mass of the rubber component in the rubber composition. Only one of or a combination of two or more of these anti-aging agents can be employed. The primary anti-aging agents may for example be phenol-based anti-aging agents, amine-based anti-aging agents, acrylate-based anti-aging agents, imidazole-based anti-aging agents, metal carbamates and waxes. The secondary anti-aging agents may for example be, phosphorus-based anti-aging agents, sulfur-based anti-aging agents, imidazole-based anti-aging agents and the like. Examples of the anti-aging agents may for example be, but are not limited particularly to, N-phenyl-1-naphthylamine, alkylated diphenylamine, octylated diphenylamine, 4,4'-bis(α,α-dimethylbenzyl)diphenylamine, p-(p-toluenesulfonylamide)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydoxypropyl)-p-phenylenediamine, 1,1,3-tris-(2-methyl-4-hydoxy-5-t-butyl phenyl)butane, 4,4'-butylidene bis-(3-methyl-6-t-butyl phenol), 2,2-thiobis(4-methyl-6-t-butylphenol), 7-octadecyl-3-(4'-hydoxy-3',5'-di-t-butylphenyl)propionate, tetrakis-[methylene-3-(3',5'-di-t-butyl-4'-hydoxyphenyl)propionate]methane, pentaerythritol-tetrakis[3-(3,5-di-t-butyl-4-hydoxyphenyl)propionate], triethylene glycol-bis[3-(3-t-butyl-5-methyl-4-hydoxyphenyl)propionate], 1,6-hexanediol-bis[3-(3,5-di-t-butyl-4-hydoxyphenyl) propionate], 2,4-bis(n-octylthio)-6-(4-hydoxy-3,5-di-t-butylanilino)-1,3,5-triazine, tris-(3,5-di-t-butyl-4-hydoxybenzyl)-isocyanurate, 2,2-thio-diethylenebis[3-(3,5-di-t-butyl-4-hydoxyphenyl)propionate], N,N'-hexamethylenebis(3,5-di-t-butyl-4-hydoxy)-hydrocinnamide, 2,4-bis[(octylthio)methyl]-o-cresol, 3,5-di-t-butyl-4-hydoxybenzyl-phosphonate-diethyl ester, tetrakis[methylene(3,5-di-t-butyl-4-hydoxyhydrocinnamate)]methane, octadecyl-3-(3,5-di-t-butyl-4-hydoxyphenyl)propionate and 3,9-bis[2-{3-(3-t-butyl-4-hydoxy-5-methyl phenyl)propionyloxy}-1,1-dimethyl ethyl]-2,4,8,10-tetraoxaspiro[5.5]undecane, tris(nonyl phenyl)phosphite, tris(mixed mono- and di-nonylphenyl)phosphite, diphenyl mono(2-ethyl hexyl)phosphite, diphenyl monotridecyl phosphite, diphenyl isodecyl phosphite, diphenyl isooctyl phosphite, diphenyl nonylphenyl phosphite, triphenyl phosphite, tris(tridecyl)phosphite, triisodecylphosphite, tris(2-ethyl hexyl)phosphite, tris(2,4-di-t-butylphenyl)phosphite, tetraphenyl dipropylene glycol diphosphite, tetraphenyl tetra (tridecyl)pentaerythritol tetraphosphite, 1,1,3-tris(2-methyl-4-di-tridecylphosphite-5-t-butyl phenyl)butane, 4,4'-butylidenebis(3-methyl-6-t-butyl-di-tridecylphosphite), 2,2'-ethylidene bis(4,6-di-t-butyl phenol)fluorophosphite, 4,4'-isopropylidene-diphenolalkyl (C12 to C15)phosphite, cyclic neopentanetetrayl bis(2,4-di-t-butyl phenyl phosphite), cyclic neopentanetetrayl bis(2,6-di-t-butyl-4-phenyl phosphite), cyclic neopentanetetrayl bis(nonylphenyl phosphite), bis(nonylphenyl)pentaerythritol diphosphite, dibutyl hydrogen phosphite, distearyl pentaerythritol diphosphite and hydrogenated bisphenol A pentaerythritol phosphite polymer, 2-mercaptobenzoimidazole and the like.

For the purpose of increasing the adhesiveness of the rubber component of the aforementioned statistical copolymer or a natural rubber with fillers and reinforcing agents thereby improving the mechanical strength, silane coupling agents may additionally be added. The silane coupling agent may be added upon kneading of the rubber composition, or may be added in a manner of a preliminary surface treatment of the fillers or the reinforcing agents, whichever appropriate. Only one of or a combination of two or more of the silane coupling agents may be employed. Those which can be exemplified include, but are not limited to, bis-(3-triethoxysilylpropyl)tetrasulfide, bis-(3-trimethoxysilylpropyl) tetrasulfide, bis-(3-methyl dimethoxysilylpropyl)tetrasulfide, bis-(2-triethoxysilylethyl)tetrasulfide, bis-(3-triethoxysilylpropyl)disulfide, bis-(3-trimethoxysilylpropyl) disulfide, bis-(3-triethoxysilylpropyl)trisulfide, 3-hexanoylthiopropyl triethoxysilane, 3-octanoylthiopropyl triethoxysilane, 3-decanoylthiopropyl triethoxysilane, 3-lauroylthiopropyl triethoxysilane, 2-hexanoylthioethyl triethoxysilane, 2-octanoylthioethyl triethoxysilane, 2-decanoylthioethyl triethoxysilane, 2-lauroylthioethyl triethoxysilane, 3-hexanoylthiopropyl trimethoxysilane, 3-octanoylthiopropyl trimethoxysilane, 3-decanoylthiopropyl trimethoxysilane, 3-lauroylthiopropyl trimethoxysilane, 2-hexanoylthioethyl trimethoxysilane, 2-octanoylthioethyl trimethoxysilane, 2-decanoylthioethyl trimethoxysilane, 2-lauroylthioethyl trimethoxysilane, 3-mercaptopropyl trimethoxysilane, 3-mercaptopropyl triethoxysilane, 3-mercaptopropyl methyl dimethoxysilane, 3-aminopropyl trimethoxysilane, 3-aminopropyl triethoxysilane, γ-glycidoxypropyl trimethoxysilane, γ-glycidoxypropyl methyl diethoxysilane, 3-trimethoxysilylpropyl-N,N-dimethylthiocarbamoyl tetrasulfide, 3-trimethoxysilylpropyl benzothiazolyl tetrasulfide, 3-trimethoxysilylpropylmetacroyl monosulfide, methyl trimethoxysilane, methyl triethoxysilane, dimethyl diethoxysilane, dimethyl dimethoxysilane, trimethyl ethoxysilane, trimethyl methoxysilane, isobutyl trimethoxysilane, n-decyltrimethoxysilane, phenyl trimethoxysilane, phenyl triethoxysilane, diphenyl dimethoxysilane, diphenyl diethoxysilane, hexyl trimethoxysilane, octadecylmethyl dimethoxysilane, octadecyltrimethoxysilane, methyl trichlorosilane, dimethyl dichlorosilane, triphenyl chlorosilane, heptadecafluorodecylmethyl dichlorosilane, heptadecafluorodecyltrichlorosilane, triethyl chlorosilane and the like.

The aforementioned rubber composition can be produced according to ordinary methods using known machines or devices.

The rubber composition of the present embodiment is excellent in terms of oil resistance, low temperature compression set and flex fatigue resistance because it contains the aforementioned statistical copolymer. It is also capable of possessing an excellent mechanical strength.

<5. Vulcanized Molded Article>

A vulcanized molded article according to the fifth embodiment is produced by vulcanizing a composition containing the aforementioned rubber composition. The vulcanized molded article of present embodiment is excellent in terms of oil resistance because it employs the aforementioned statistical copolymer. It is also capable of possessing an excellent mechanical strength.

The vulcanizing temperature may be set appropriately depending on the composition, and may for example be 130 to 230° C. The vulcanizing time period may also be set appropriately depending on the composition and the shape, and may for example be 10 to 90 minutes. The molding method is not limited particularly, and may be any of known methods such as press molding, extrusion molding, injection molding, calendar molding and the like. Also, by conducting a secondary vulcanization if necessary at 150 to 200° C., the compression set can be improved.

The vulcanized molded article according to the present embodiment is a vulcanized molded article using a statistical copolymer of a chloroprene monomer unit and an unsaturated nitrile monomer unit whose unsaturated nitrile monomer unit content (herein sometimes referred to as binding level) is 8 to 20% by mass.

In addition, the vulcanized molded article according to the present embodiment has an oil resistance to IRM903 oil measured in accordance with JIS K6258 of $\Delta W<+15\%$.

In addition, the vulcanized molded article according to the present embodiment has a compression set after 72 hours at 0° C. measured in accordance with JIS K 6262 of 25% or less, In addition, the vulcanized molded article according to the present embodiment has a flex fatigue resistance at 40° C. measured in accordance with JIS K 6260 of 100,000 cycles or more.

Moreover, the vulcanized molded article relating to the present embodiment can have mechanical characteristics measured in accordance with JIS K6251 including a tensile strength at break >20 MPa and an elongation at break >300%.

The most preferable vulcanized molded article according to the present embodiment is a vulcanized molded article containing a statistical copolymer of a chloroprene monomer unit and an unsaturated nitrile monomer unit whose unsaturated nitrile monomer unit content (herein sometimes referred to as binding level) is 8 to 20% by mass. This vulcanized molded article has an especially excellent low temperature characteristics reflected by an oil resistance to IRM903 oil measured in accordance with JIS K6258 of $\Delta W<+15\%$, and a compression set after 72 hours at 0° C. measured in accordance with JIS K 6262 of 20% or less. Accordingly, it can especially be used preferably in the following uses, and can preferably be used particularly as a seal member or a hose.

A statistical copolymer according to the present embodiment, a latex and a rubber composition containing said statistical copolymer, as well as a vulcanized molded article obtained by vulcanizing a composition containing said rubber composition are used preferably in power transmission belts, conveyer belts, hoses, wipers, dip products, seal members, adhesives, boots, rubberized fabrics, rubber rolls, vibration-proof rubbers and sponge products.

(Conveyer Belts and Power Transmission Belts)

A conveyer belt is a broad belt employed in a belt conveyer and the like, and used for article transport and the like. A power transmission belt is a machine component used in a winding transmission device, and is a part which transmits a motive power from a driving wheel to a driven wheel. The power transmission belt is used frequently as being engaged with a pulley attached to an axis. The power transmission belt is employed widely in all machines such as automobiles and general industrial vehicles because it is excellent in terms of light weight, quietness, freedom in changing axis angle and the like. There is also a diversity in the types pf the power transmission belt, including plane belt, timing belt, V belt, rib belt, round belt and the like, which are utilized differently on the basis of application to a machine. Since the conveyer belt and the power transmission belt enables an efficient transfer of a motive power because of which a belt stretched under a high tension undergoes repetitive rotational deformation, elastomer materials such as NR (natural rubber), SBR (styrene butadiene rubber), CR (chloroprene rubber), NBR (nitrile rubber), HNBR (hydrogenated nitrile rubber) and the like are employed. While CR is adopted in various conveyer belts, automobile, general industrial power transmission belts and the like because of its excellent rubber properties and oil resistance, it is still a neverending technical problem to improve the machine properties in order to tolerate a high tension. Also, the power transmission belt for a machine tool used on a site of construction is demanded to be further improved in terms of the oil resistance because it is used sometimes in an environment posing an exposure to scattered oils. Also, since a belt is used continuously in a dynamic environment, a material having an excellent flex fatigue resistance is needed aiming at a higher reliability of the product.

The statistical copolymer according to the present embodiment is possible to enhance the mechanical strength, the oil resistance and the flex fatigue resistance of the conveyer belts and the power transmission belts. As a result, it enables production of a belt which can be used even in an environment posing an exposure to scattered oils which was difficult when using a conventional CR.

(Hoses)

A hose is a bendable tube and employed in an operation requiring an ability of being bent freely, a portability and a mobility, such as watering. Also, because of its reduced tendency of undergoing fatigue fracture due to deformation when compared with a hard tube such as a metal pipe, it is used in a piping at a vibrating position such as an automobile piping. One of the most general hoses is a rubber hose. The rubber hose is made from NR, CR, EPDM (ethylene propylene diene rubber), SBR, NBR, ACM (acrylic rubber), AEM (ethylene acrylic rubber), HNBR, ECO (epichlorhydrin rubber), FKM (fluorine rubber) and the like, and presented as a hose for water pumping, oil pumping, air pumping and vapor pumping as well as a hydraulic hose for high and low pressure and the like. While CR is used majorly in a hydraulic hose for high pressure because of its satisfactory machine properties enabling endurance against a high pressure of a fluid, its insufficient oil resistance allows NBR to be employed generally as an inner layer. Nevertheless, it is difficult to bond CR and NBR whose chemical structures are different substantially from each other, and insufficient bonding results in a problematic interfacial peeling. Accordingly, a material having satisfactory mechanical strength, oil resistance and adhesiveness is desired. There is another problem relating to the hose joint part where a hose band is fitted to ensure swaging for preventing leakage of a fluid, which however results in a sagging of the hoses over a prolonged fitting which leads to problematic leakage of the fluid.

The statistical copolymer according to the present embodiment is capable of enhancing the mechanical strength, the oil resistance and the sag resistance (low compression set property) of a hose. As a result, it is possible to produce a hose brought into direct contact with a non-polar fluid which is difficult when using a conventional CR.

(Wipers)

On a front glass, rear glass and the like of an automobile, train, aircraft, ship, building machine and the like, a wiper is provided usually to wipe off or remove rain drops, muddy water, oil stain, sea water, ice, snow, dust and the like depositing on the surface to obtain a clear vision thereby securing safe driving. On the part where this wiper is brought into contact with the glass surface, a wiper blade is fitted, and the material for the wiper blade is generally NR, CR and the like. Since CR has mechanical strength and fatigue endurance against repetitive deformation and is excellent in terms of wipeability, it is used in automobile wipers. However, its insufficient oil resistance causes a problematic reduction in the wipeability when the rubber material is swollen due to an oil stain. Accordingly, in an environment having substantial oil stains, a wiper blade having an excellent oil resistance is demanded. Since the wiper is fitted as being pressed against the window, it may undergo problematic sagging and reduction in the wiping performance if not operated for a prolonged period.

The statistical copolymer according to the present embodiment is capable of enhancing the mechanical strength, the oil resistance, the fatigue endurance and the sag resistance (low compression set property) of the wiper. As a result, it can produce a wiper capable of being used even in an environment having substantial oil stains, which is difficult when using a conventional CR.

(Dip Products)

Rubber latexes including natural rubbers and synthetic rubbers such as CR, IR (isoprene rubber), NBR and the like are employed as starting materials for dip molding products such as medical surgical gloves, laboratory gloves, industrial gloves, balloons, catheters, rubber boots, reinforcing fiber and the like. Especially in the rubber latexes for the medical surgical gloves, the laboratory gloves, the industrial gloves and the household gloves, synthetic rubbers such as CR, IR, NBR and the like are favorable for avoiding the problems of allergy-induced shock symptoms (anaphylaxis) attributable to the natural rubbers. Among these, CR gloves are adopted in food plants and machine plants because they have well-balanced pliability and mechanical strength and exhibit a high oil resistance. While thin gloves are increasingly demanded in these days from the viewpoints of operability, accompanying problems are experienced such as reduction in the strength and the oil resistance. Also, for the purpose of reducing the allergy attributable to vulcanization accelerators, development of vulcanization accelerator-free gloves are advanced, but also involves technically problematic reduction in the strength and the oil resistance. Also, in RFL which was surface-treated by immersion of reinforcing fibers in order to enhance adhesiveness to rubbers, CR is employed. When used in belts for which the reinforcing fibers are intended to be used, the mechanical strength and the oil resistance are increasingly demanded as described above. Therefore, development of a polychloroprene latex exhibiting further excellent mechanical strength and oil resistance is strongly desired.

The statistical copolymer according to the present embodiment is capable of enhancing the mechanical strength and the oil resistance of the dip products. As a result, it is capable of producing thin gloves and vulcanization accelerator-free dip products which is difficult when using a conventional CR.

(Seal Members)

A seal member is a part which prevents liquid or gas leakage or entry of rain or dust into a machine or a device, and plays an important role in maintaining the performance of the machine. The seal members are grouped into gaskets used for fixation and packings used in moving parts movable parts. For the gasket whose seal part is fixed by a bolt and the like, various elastomers suitable to the purposes are employed for soft gaskets such as O-rings or rubber sheets. The packing is used in an axis of pump or motor, a rotating part such as valve movable part, a reciprocal moving part such as piston, a coupler connecting part, a water stop part of a water faucet and the like. An oil seal used for sealing a hydraulic instrument at a relatively low pressure or a lubricant serves to secure the seal utilizing the elasticity of an elastomer. In these elastomer seal members, CR is used in a seal member for a polar gas or liquid since it has a satisfactory mechanical strength. On the other hand, for use in a seal member for a non-polar fluid such as an engine oil or a gear oil, the oil resistance of CR is insufficient, and should be improved.

The statistical copolymer according to the present embodiment is capable of enhancing the mechanical strength and the oil resistance of the seal member. As a result, it is capable of producing a seal member for a non-polar fluid such as an engine oil or a gear oil which is difficult when using a conventional CR. In addition to those described above, the statistical copolymer according to the present embodiment also allow a satisfactory sag resistance (low compression set property) to be obtained, thereby reducing the change in the shape of the seal member even when used for a prolonged period and achieving a satisfactory seal performance. In such use, the sag resistance (low compression set property) at a low temperature is especially important.

Specifically, the seal members to which the present embodiment can be applied are, for example, engine head cover gasket, oil pan gasket, oil seal, lip seal packing, O-ring, transmission seal gasket, crankshaft, camshaft seal gasket, valve stem, power steering seal belt cover seal and the like.

(Adhesives)

CR is utilized as an adhesive for a wide range of materials such as civil engineering and construction, plywood, furniture, shoes, wet suits, automobile interior materials because of its contact performance and excellent initial adhesive strength. Since CR is excellent in terms of the initial adhesive strength and the heat adhesion strength, it is increasingly demanded to be used as a one-component adhesive for a polyurethane foam widely employed as a material for furniture and automobile interior materials among those listed above. While the automobile interiors should aesthetically be satisfactory, CR undergoes, when droplets of various oils or fuels employed in the automobile are deposited on an adherent, interfacial peeling or formation of curved surface of the adherent because of its insufficient oil resistance. Accordingly, an adhesive material having a high oil resistance is desired.

The statistical copolymer according to the present embodiment is capable of enhancing the mechanical strength and the oil resistance of the adhesives. As a result, it is possible to produce more excellent adhesives when compared with conventional CR.

(Boot)

A boot is an element in the form of bellows whose outer diameter increases in the direction from one end to the other, and includes a boot for a constant-velocity joint cover, a boot for a ball joint cover (dust cover boot) and a boot for a rack and pinion gear, for protecting the drive part of the automobile drive system. Since a boot is required to have oil resistance together with physical strength to tolerate a massive deformation, CR is employed widely. Recently, the space allowed for boot movement became smaller in response to advancement of technologies to achieve light weight and compactness of an automobile, because of which the heat removal efficiency is lowered and the heat environment becomes severer. Accordingly, a higher reliability against non-polar liquids such as oils and greases contained inside the boot under a high temperature atmosphere is desired.

The statistical copolymer according to the present embodiment is capable of enhancing the mechanical strength, the oil resistance and the fatigue endurance of the boot. As a result, it is capable of producing a boot having an excellent reliability against non-polar liquids such as oils and greases contained inside when compared with conventional CR. Since it is excellent also in terms of the sag resistance (low compression set property), it suppresses the deformation of a swaging part for preventing leakage of an oil contained inside such as a metal band.

(Rubberized Fabrics)

A rubberized fabric is a composite material of a rubber and a woven fabric (fiber) made by pasting the rubber onto the fabric, has a strength greater than that of a rubber sheet, and is excellent in terms of water resistance and air tightness. Such a property is utilized widely in various applications such as rubber boats, tent materials, clothes such as raincoats, water-proof sheets for building, cushioning materials and the like. The rubber material employed in the rubberized fabrics is generally CR, NBR, EPDM and the like. Among these, CR is employed widely in fabrics used outdoor such as rubber boats because of its excellent mechanical strength and weatherability. On the other hand, the oil resistance is insufficient for use in a rubberized fabric sheet material used in an environment where oils are scattered such as automobiles and construction sites and is demanded to be improved.

The statistical copolymer according to the present embodiment is capable of enhancing the mechanical strength and the oil resistance of the rubberized fabrics. As a result, it is possible to produce a rubberized fabric capable of being used even in an environment where oils are scattered, which is difficult when using a conventional CR.

(Rubber Rolls)

A rubber roll is a roll produced by subjecting a metal core such as an iron core to adhesive coating with a rubber, and generally produced by rolling a rubber sheet around a metallic iron core in a swirling pattern. The rubber roll employs rubber materials such as NBR, EPDM, CR and the like depending on the required characteristics in various uses such as papermaking, steel manufacture, printing and the like. CR is employed in a wide range of roll uses, because it has a satisfactory mechanical strength capable of tolerating the friction caused by an article being transported. On the other hand, the oil resistance is insufficient for a rubber roll which is employed in an environment causing oil deposition such as production of industrial materials or products for steel manufacture or papermaking, and desired to be improved. In addition, a rubber roll which transports a heavy article exhibits a problematic deformation due to the load, which should also be improved.

The statistical copolymer according to the present embodiment is capable of enhancing the mechanical strength, the oil resistance and the sag resistance (low compression set property) of the rubber roll. As a result, it is capable of producing a rubber roll employed in an environment causing oil deposition which is difficult when using a conventional CR.

(Vibration-Proof Rubbers)

A vibration-proof rubber is a rubber which prevents transfer and spreading of a vibration, and employed for example in uses for sound insulation, impact cushioning, and prevention of external spreading of a vibration generated from a machine. For example, a vibration-proof rubber is employed as a constituent material of a torsional damper, an engine mount, a muffler hanger and the like for absorbing the vibration upon engine drive and preventing noises in automobiles or various vehicles. While a natural rubber having excellent vibration-proof characteristics is widely employed in a vibration-proof rubber, the vibration-proof rubber used in an environment causing oil scattering, such as that for a heavy equipment for construction, is required to have oil resistance, and accordingly CR is employed. Since the vibration-proof rubber undergoes a reduction in the mechanical strength if it is swollen as a result of deposition of an oil and causes a problematic early rupture, it is required to be improved. Also, since it is employed in a dynamic environment, durability against repetitive deformation is desired to be improved.

The statistical copolymer according to the present embodiment is capable of enhancing the mechanical strength, the oil resistance and the flex fatigue resistance of the vibration-proof rubber. As a result, it is capable of producing a vibration-proof rubbers which can be employed in an environment causing oil scattering which is difficult when using a conventional CR.

(Sponge Products)

A sponge is a porous material having voids of innumerable fine pores therein. A pore can be in both of the forms of an open cell and a closed cell. When the pores are sufficiently large and continuous to each other, they are characterized by an ability of absorbing a liquid in a manner of replacement with air inside the pores when immersed in the liquid and an ability of releasing readily in response to an external force. On the other hand, fine pores enable uses as excellent cushioning materials and heat insulating materials. Since CR has excellent mechanical strength and rubber elasticity, it is used widely in the sponges, specific examples of which include vibration-proof elements, sponge seal members, wetsuits, shoes and the like. In any of such uses, the oil resistance is required to be improved in order to prevent swelling deformation and decoloration due to oils.

The statistical copolymer according to the present embodiment is capable of enhancing the mechanical strength and the oil resistance of the sponge products. As a result, it is capable of producing a sponge product having a reduced tendency of swelling deformation and decoloration due to oils which is difficult when using a conventional CR.

EXAMPLES

The present invention is described in more detail based on Examples. Examples described below only exemplify the representatives of the present invention, and the present invention is not limited to these Examples.

(1) Experiment Example 1

In Experiment example 1, the effects of a method for adding a chloroprene monomer in a production step and the compositions and the properties of a chloroprene-acrylonitrile statistical copolymer on the mechanical characteristics and the oil resistance of vulcanized molded articles were verified.
<Production of Statistical Copolymers>

Example 1

(Preparation of Chloroprene-Acrylonitrile Statistical Copolymer Latex)
To a 3-L polymerization chamber fitted with a heating/cooling jacket and a stirrer, 28 parts by mass of a chloroprene monomer, 28 parts by mass of an acrylonitrile monomer, 0.5 parts by mass of diethylxanthogen disulfide, 200 parts by mass of a purified water, 5.00 parts by mass of potassium rosinate (Manufactured by Harima Chemicals Group, Inc.), 0.40 parts by mass of sodium hydroxide and 2.0 parts by mass of sodium salt of ß-naphthalene sulfonic acid formalin condensate (Manufactured by Kao Corporation) were added. 0.1 Parts by mass of potassium persulfate was added as a polymerization initiator, and emulsion polymerization was conducted under a nitrogen flow at a polymerization temperature of 40° C. Portionwise addition of the chloroprene monomer was started 20 seconds after polymerization initiation, and, based on the refrigerant calorimetric change for 10 seconds after polymerization initiation, the portionwise addition flow rate was adjusted by an electromagnetic valve, and thereafter the flow rate was re-adjusted every 10 seconds to ensure continuity. At the time point when the polymerization rate to the total quantity of the chloroprene monomer and the acrylonitrile monomer became 50%, 0.0065 parts by mass of phenothiazine as a polymerization inhibitor was added to terminate the polymerization, then by removing the unreacted monomer in the reaction solution under reduced pressure, the chloroprene-acrylonitrile statistical copolymer latex was obtained.

While the polymerization fluid was sampled 10 cycles or more regularly during the polymerization to analyze unreacted chloroprene monomer and acrylonitrile monomer contained in the polymerization fluid, the mass ratio between the acrylonitrile monomer and the total of the chloroprene monomer and the acrylonitrile monomer was always within ±5% of the target value.
(Quantitative Analysis of Monomer in Polymerization Fluid)
1.0 g of the sampled polymerization fluid was weighed into a 25-ml volumetric flask, diluted to 25 ml with tetrahydrofuran and agitated, and the resultant sample was subjected an ordinary quantitative analysis method using a gas chromatograph and a calibration curve (the same applies hereinafter).

[Gas Chromatography Conditions]
Measurement instrument: Shimadzu Corporation GC-2010
Carrier gas: Helium
Injector temperature: 270° C.
Detector: FID
Detector temperature: 300° C.
Column type: DB-1, 0.25 mm×60 m
Injection volume: 1 µl
Column temperature: Elevation from 50° C. to 100° C. by 5° C./minutes
(Polymerization Rate of Chloroprene-Acrylonitrile Statistical Copolymer Synthesis)
The polymerization rate from the polymerization initiation of the chloroprene-acrylonitrile statistical copolymer through a certain time was calculated from a dry weight obtained by air-drying the chloroprene-acrylonitrile statistical copolymer latex. Specifically, Formula (XII) shown below was employed for calculation. The dry weight in the course of the polymerization was calculated by Formula (XII) by adding to the latex a polymerization inhibitor in such a small amount that had no effect on the dry weight. In the formula, the solid concentration is the concentration (% by mass) of the solid fraction obtained by heating after heating 2 g of the sampled emulsified polymerization at 130° C. to remove the solvent (water), volatile chemicals and the starting materials followed by deleting the volatile fraction from the change in the weight before and after the heating. The total input quantity and the non-evaporated residual fraction were calculated from the polymerization formulation. The total input quantity is the total quantity of the starting materials, the reagents and the solvent (water) which had been input into the polymerization chamber from the polymerization initiation through the certain time. The non-evaporated residual fraction is the weight of the chemicals which did not evaporate under the condition of 130° C. and remained in a solid fraction together with the polymer, among the chemicals and the starting materials which had been input from the polymerization initiation through the certain time. The monomer input quantity is a total of the monomer which was input initially to the polymerization chamber and the monomer added portionwise from the polymerization initiation through the certain time. As used herein, the monomer refers to the total quantity of the chloroprene monomer and the acrylonitrile monomer.

Polymerization rate [%]={(total input quantity [g]× solid concentration [% by mass]/100)−(non-evaporated residual fraction [g])}/monomer input quantity [g]×100    (XII)

(Recovery of Chloroprene-Acrylonitrile Statistical Copolymer)
The chloroprene-acrylonitrile statistical copolymer latex obtained by the polymerization was adjusted at pH7.0, and freeze-coagulated on a metal plate cooled to −20° C. thereby effecting demulsification. The resultant sheet was washed with water and dried for 15 minutes at 130° C., thereby obtaining a chloroprene-acrylonitrile statistical copolymer in a solid form.

The number average molecular weight Mn, the mass average molecular weight Mw, and the molecular weight distribution (Mw/Mn) of the chloroprene-acrylonitrile statistical copolymer were measured using TOSOH HLC-8320GPC (converted to standard polystyrene) after adjusting the recovered sample at a sample adjustment concentration of 0.1% by mass using THF. This was conducted using TSK guard column HHR-H as a precolumn and three HSKgelGMHHR-H3 as analytical columns, and elution was conducted at a sample pump pressure of 8.0 to 9.5 MPa and a flow rate of 1 mL/min at 40° C., and the detection was conducted using a differential refractometer.

For the elution time and the molecular weight, a correction curve obtained by measuring 9 standard polystyrene samples in total whose molecular weights are known was employed. (Mw=8.42×10$^6$, 1.09×10$^6$, 7.06×10$^5$, 4.27×10$^5$, 1.90×10$^5$, 9.64×10$^4$, 3.79×10$^4$, 1.74×10$^4$, 2.63×10$^3$)

(Acrylonitrile Binding Level of Chloroprene-Acrylonitrile Statistical Copolymer)

The acrylonitrile binding level was calculated from the nitrogen atom content obtained by a chemical analysis. The nitrogen atom content of a polymer was determined by an element analysis device (SUMIGRAPH 220F: manufactured by Sumika Chemical Analysis Service, Ltd.) using 100 mg of a dried sample. The electric furnace temperature setting were reaction furnace at 900° C., reduction furnace at 600° C., column temperature of 70° C. and detector temperature of 100° C., and the combustion gas was an oxygen flown at 0.2 ml/min and the carrier gas was a helium flown at 80 ml/min. A calibration curve was made using aspartic acid whose nitrogen content is known (10.52%) as a standard.

As a result, the number average molecular weight (Mn) was 138×10$^3$ g/mol, the weight average molecular weight (Mw) was 473×10$^3$ g/mol, and the molecular weight distribution (Mw/Mn) was 3.4. The acrylonitrile binding level of the chloroprene-acrylonitrile statistical copolymer was 8.9% by mass.

Example 2

(Preparation of Chloroprene-Acrylonitrile Statistical Copolymer Latex)

To a 3-L polymerization chamber, 20 parts by mass of a chloroprene monomer, 47 parts by mass of an acrylonitrile monomer, 0.5 parts by mass of diethylxanthogen disulfide, 200 parts by mass of a purified water, 5.00 parts by mass of potassium rosinate (Manufactured by Harima Chemicals Group, Inc.), 0.40 parts by mass of sodium hydroxide and 2.0 parts by mass of sodium salt of ß-naphthalene sulfonic acid formalin condensate (Manufactured by Kao Corporation) were added. 0.1 Parts by mass of potassium persulfate was added as a polymerization initiator, and polymerization was conducted under a nitrogen flow at a polymerization temperature of 40° C. Portionwise addition of the chloroprene monomer was started 20 seconds after polymerization initiation, and, based on the refrigerant calorimetric change for 10 seconds after polymerization initiation the portionwise addition flow rate was adjusted by an electromagnetic valve, and thereafter the flow rate was re-adjusted every 10 seconds to ensure continuity. At the time point when the polymerization rate to the total quantity of the chloroprene monomer and the acrylonitrile monomer became 50%, 0.0065 parts by mass of phenothiazine as a polymerization inhibitor was added to terminate the polymerization. Then, by removing the unreacted monomer in the reaction solution under reduced pressure, the chloroprene-acrylonitrile statistical copolymer latex was obtained.

While the polymerization fluid was sampled 10 cycles or more regularly during the polymerization to measure unreacted chloroprene monomer and acrylonitrile monomer contained in the polymerization fluid, the mass ratio between the acrylonitrile monomer and the total of the chloroprene monomer and the acrylonitrile monomer was always within ±5% of the target value.

(Recovery of Chloroprene-Acrylonitrile Statistical Copolymer)

The chloroprene-acrylonitrile statistical copolymer latex obtained was adjusted at pH7.0, and freeze-coagulated on a metal plate cooled to −20° C. thereby effecting demulsification. The resultant sheet was washed with water and dried for 15 minutes at 130° C., thereby obtaining a chloroprene-acrylonitrile statistical copolymer in a solid form.

(Analysis of Chloroprene-Acrylonitrile Statistical Copolymer)

As a result of analysis similar to that in Example 1, the number average molecular weight (Mn) was 130×10$^3$ g/mol, the weight average molecular weight (Mw) was 442×10$^3$ g/mol, the molecular weight distribution (Mw/Mn) was 3.4. The acrylonitrile binding level of the chloroprene-acrylonitrile statistical copolymer was determined by conducting the element analysis of the nitrogen atom in the polymer, and was 16.2% by mass.

Example 31

(Preparation of Chloroprene-Acrylonitrile Statistical Copolymer Latex)

To a 3-L polymerization chamber, 28 parts by mass of a chloroprene monomer, 28 parts by mass of an acrylonitrile monomer, 0.5 parts by mass of diethylxanthogen disulfide, 200 parts by mass of a purified water, 5.00 parts by mass of potassium rosinate (Manufactured by Harima Chemicals Group, Inc.), 0.40 parts by mass of sodium hydroxide, 2.0 parts by mass of sodium salt of ß-naphthalene sulfonic acid formalin condensate (Manufactured by Kao Corporation) were added. 0.1 Parts by mass of potassium persulfate was added as a polymerization initiator, and polymerization was conducted under a nitrogen flow at a polymerization temperature of 10° C. Portionwise addition of the chloroprene monomer was started 20 seconds after polymerization initiation, and, based on the refrigerant calorimetric change for 10 seconds after polymerization initiation, the portionwise addition flow rate was adjusted by an electromagnetic valve, and thereafter the flow rate was re-adjusted every 10 seconds to ensure continuity. At the time point when the polymerization rate to the total quantity of the chloroprene monomer and the acrylonitrile monomer became 50%, 0.0065 parts by mass of phenothiazine as a polymerization inhibitor was added to terminate the polymerization. Then, by removing the unreacted monomer in the reaction solution under reduced pressure, the chloroprene-acrylonitrile statistical copolymer latex was obtained.

While the polymerization fluid was sampled 10 cycles or more regularly during the polymerization to measure unreacted chloroprene monomer and acrylonitrile monomer contained in the polymerization fluid, the mass ratio between the acrylonitrile monomer and the total of the chloroprene monomer and the acrylonitrile monomer was always within ±5% of the target value.

(Recovery of Chloroprene-Acrylonitrile Statistical Copolymer)

The chloroprene-acrylonitrile statistical copolymer latex obtained was adjusted at pH7.0, and freeze-coagulated on a metal plate cooled to −20° C. thereby effecting demulsification. The resultant sheet was washed with water and dried for 15 minutes at 130° C., thereby obtaining a chloroprene-acrylonitrile statistical copolymer in a solid form.

(Analysis of Chloroprene-Acrylonitrile Statistical Copolymer)

As a result of analysis similar to that in Example 1, the number average molecular weight (Mn) was 133×10$^3$ g/mol, the weight average molecular weight (Mw) was 462×10³ g/mol, the molecular weight distribution (Mw/Mn) was 3.5. The acrylonitrile binding level of the chloroprene-acrylonitrile statistical copolymer was determined by conducting the element analysis of the nitrogen atom in the polymer, and was 9.1% by mass.

Example 4

(Preparation of Chloroprene-Acrylonitrile Statistical Copolymer Latex)

To a 3-L polymerization chamber, 28 parts by mass of a chloroprene monomer, 28 parts by mass of an acrylonitrile monomer, 0.5 parts by mass of diethylxanthogen disulfide, 200 parts by mass of a purified water, 5.00 parts by mass of potassium rosinate (Manufactured by Harima Chemicals Group, Inc.), 0.40 parts by mass of sodium hydroxide, 2.0 parts by mass of sodium salt of f-naphthalene sulfonic acid formalin condensate (Manufactured by Kao Corporation) were added. 0.1 Parts by mass of potassium persulfate was added as a polymerization initiator, and polymerization was conducted under a nitrogen flow at a polymerization temperature of 20° C. Portionwise addition of the chloroprene monomer was started 20 seconds after polymerization initiation, and, based on the refrigerant calorimetric change for 10 seconds after polymerization initiation, the portionwise addition flow rate was adjusted by an electromagnetic valve, and thereafter the flow rate was re-adjusted every 10 seconds to ensure continuity. At the time point when the polymerization rate to the total quantity of the chloroprene monomer and the acrylonitrile monomer became 50%, 0.0065 parts by mass of phenothiazine as a polymerization inhibitor was added to terminate the polymerization. Then, by removing the unreacted monomer in the reaction solution under reduced pressure, the chloroprene-acrylonitrile statistical copolymer latex was obtained.

While the polymerization fluid was sampled 10 cycles or more regularly during the polymerization to measure unreacted chloroprene monomer and acrylonitrile monomer contained in the polymerization fluid, the mass ratio between the acrylonitrile monomer and the total of the chloroprene monomer and the acrylonitrile monomer was always within ±5% of the target value.

(Recovery of Chloroprene-Acrylonitrile Statistical Copolymer)

The chloroprene-acrylonitrile statistical copolymer latex obtained was adjusted at pH7.0, and freeze-coagulated on a metal plate cooled to −20° C. thereby effecting demulsification. The resultant sheet was washed with water and dried for 15 minutes at 130° C., thereby obtaining a chloroprene-acrylonitrile statistical copolymer in a solid form.

(Analysis of Chloroprene-Acrylonitrile Statistical Copolymer)

As a result of analysis similar to that in Example 1, the number average molecular weight (Mn) was 135×10³ g/mol, the weight average molecular weight (Mw) was 454×10³ g/mol, the molecular weight distribution (Mw/Mn) was 3.4. The acrylonitrile binding level of the chloroprene-acrylonitrile statistical copolymer was determined by conducting the element analysis of the nitrogen atom in the polymer, and was 9.0% by mass.

Example 5

(Preparation of Chloroprene-Acrylonitrile Statistical Copolymer Latex)

To a 3-L polymerization chamber, 28 parts by mass of a chloroprene monomer, 28 parts by mass of an acrylonitrile monomer, 0.5 parts by mass of diethylxanthogen disulfide, 200 parts by mass of a purified water, 5.00 parts by mass of potassium rosinate (Manufactured by Harima Chemicals Group, Inc.), 0.40 parts by mass of sodium hydroxide and 2.0 parts by mass of sodium salt of ß-naphthalene sulfonic acid formalin condensate (Manufactured by Kao Corporation) were added. 0.1 Parts by mass of potassium persulfate was added as a polymerization initiator, and polymerization was conducted under a nitrogen flow at a polymerization temperature of 40° C. Portionwise addition of the chloroprene monomer was conducted at the times when specific gravity reached 0.997, 1.001, 1.004, 1.008, 1.012, 1.015, 1.019, 1.023, 1.026 and 1.030, each time in an amount of 4.4 parts by mass, 10 cycles of addition in total. At the time point when the polymerization rate to the total quantity of the chloroprene monomer and the acrylonitrile monomer became 50%, 0.0065 parts by mass of phenothiazine as a polymerization inhibitor was added to terminate the polymerization. Then, by removing the unreacted monomer in the reaction solution under reduced pressure, the chloroprene-acrylonitrile statistical copolymer latex was obtained.

While the polymerization fluid was sampled 10 cycles or more regularly during the polymerization to measure unreacted chloroprene monomer and acrylonitrile monomer contained in the polymerization fluid, the mass ratio between the acrylonitrile monomer and the total of the chloroprene monomer and the acrylonitrile monomer was always within ±10% of the target value.

(Recovery of Chloroprene-Acrylonitrile Statistical Copolymer)

The chloroprene-acrylonitrile statistical copolymer latex obtained was adjusted at pH7.0, and freeze-coagulated on a metal plate cooled to −20° C. thereby effecting demulsification. The resultant sheet was washed with water and dried for 15 minutes at 130° C., thereby obtaining a chloroprene-acrylonitrile statistical copolymer in a solid form.

(Analysis of Chloroprene-Acrylonitrile Statistical Copolymer)

As a result of analysis similar to that in Example 1, the number average molecular weight (Mn) was 134×10³ g/mol, the weight average molecular weight (Mw) was 453×10³ g/mol, the molecular weight distribution (Mw/Mn) was 3.4. The acrylonitrile binding level of the chloroprene-acrylonitrile statistical copolymer was determined by conducting the element analysis of the nitrogen atom in the polymer, and was 9.0% by mass.

Example 6

(Preparation of Chloroprene-Acrylonitrile Statistical Copolymer Latex)

To a 3-L polymerization chamber, 28 parts by mass of a chloroprene monomer, 28 parts by mass of an acrylonitrile monomer, 0.5 parts by mass of diethylxanthogen disulfide, 200 parts by mass of a purified water, 5.00 parts by mass of potassium rosinate (Manufactured by Harima Chemicals Group, Inc.), 0.40 parts by mass of sodium hydroxide and 2.0 parts by mass of sodium salt of ß-naphthalene sulfonic acid formalin condensate (Manufactured by Kao Corporation) were added. 0.1 Parts by mass of potassium persulfate was added as a polymerization initiator, and polymerization was conducted under a nitrogen flow at a polymerization temperature of 40° C. Portionwise addition of the chloroprene monomer was conducted at the times when specific gravity reached 0.997, 0.999, 1.000, 1.002, 1.004, 1.006, 1.007, 1.009, 1.011, 1.013, 1.014, 1.016, 1.018, 1.020, 1.021, 1.023, 1.025, 1.027, 1.028 and 1.030, each time in an amount of 2.2 parts by mass, 20 cycles of addition in total. At the time point when the polymerization rate to the total quantity of the chloroprene monomer and the acrylonitrile monomer became 50%, phenothiazine as a polymerization inhibitor was added to terminate the polymerization. Then, by removing the unreacted monomer in the reaction solution under reduced pressure, the chloroprene-acrylonitrile statistical copolymer latex was obtained.

While the polymerization fluid was sampled 10 cycles or more regularly during the polymerization to measure unreacted chloroprene monomer and acrylonitrile monomer contained in the polymerization fluid, the mass ratio between the acrylonitrile monomer and the total of the chloroprene monomer and the acrylonitrile monomer was always within ±5% of the target value.

(Recovery of Chloroprene-Acrylonitrile Statistical Copolymer)

The chloroprene-acrylonitrile statistical copolymer latex obtained was adjusted at pH7.0, and freeze-coagulated on a metal plate cooled to −20° C. thereby effecting demulsification. The resultant sheet was washed with water and dried for 15 minutes at 130° C., thereby obtaining a chloroprene-acrylonitrile statistical copolymer in a solid form.

(Analysis of Chloroprene-Acrylonitrile Statistical Copolymer)

As a result of analysis similar to that in Example 1, the number average molecular weight (Mn) was $132 \times 10^3$ g/mol, the weight average molecular weight (Mw) was $446 \times 10^3$ g/mol, the molecular weight distribution (Mw/Mn) was 3.4. The acrylonitrile binding level of the chloroprene-acrylonitrile statistical copolymer was determined by conducting the element analysis of the nitrogen atom in the polymer, and was 8.9% by mass.

Comparative Example 1

(Preparation of Chloroprene Homopolymer Latex)

In a 500-ml three-necked separable flask, 50 mg of sodium hydroxide, 1.0 g of sodium salt of ß-naphthalene sulfonic acid formalin condensate (Manufactured by Kao Corporation) and 4.43 g of potassium rosinate (Manufactured by Harima Chemicals Group, Inc.) were dissolved in 100 g of water, and deaerated for 10 minutes using a nitrogen flow while keeping the temperature at 30° C. using an oil bath.

Then, 100 g of chloroprene monomer from which the stabilizer had been removed by distillation under reduced pressure and 1.50 g of 1-dodecanthiol were added to the aforementioned separable flask, and emulsified for 10 minutes in an oil bath at 30° C. The resultant emulsified fluid was heated to 40° C., and a 2.00% by weight aqueous solution of potassium persulfate was added, and polymerization was conducted until the polymerization rate of the chloroprene monomer reached 65%. The reaction was terminated by adding a 10.00% by weight aqueous solution of N,N-diethylhydoxylamine, and the residual chloroprene monomer was removed by distillation under reduced pressure, thereby obtaining a chloroprene homopolymer latex.

(Recovery of Chloroprene Homopolymer)

The resultant chloroprene homopolymer latex was adjusted at pH7.0, and freeze-coagulated on a metal plate cooled to −20° C. thereby effecting demulsification. The resultant sheet was washed with water and dried for 15 minutes at 130° C., thereby obtaining a chloroprene homopolymer in a solid form.

(Analysis of Chloroprene Homopolymer)

As a result of analysis similar to that in Example 1, the number average molecular weight (Mn) was $138 \times 10^3$ g/mol, the weight average molecular weight (Mw) was $336 \times 10^3$ g/mol, the molecular weight distribution (Mw/Mn) was 2.4.

<Preparation of Vulcanized Rubber>

100 parts by mass of each statistical copolymer of Examples 1 to 6 or homopolymer of Comparative example 1, 2 parts by mass of 4,4'-bis(α,α-dimethylbenzyl)diphenylamine (Nocrak CD manufactured by OUCHI SHINKO CHEMICAL INDUSTRIAL CO., LTD.), 4 parts by mass of magnesium oxide (KYOWAMAG #150 manufactured by Kyowa Chemical Industry Co., Ltd.), 50 parts by mass of carbon black (SRF; ASAHI #50 manufactured by ASAHI CARBON CO., LTD.), 5 parts by mass of polyether ester-based plasticizer (Adekacizer RS-735" manufactured by ADEKA CORPORATION), 5 parts by mass of zinc oxide (manufactured by SAKAI CHEMICAL INDUSTRY CO., LTD.), 1.5 parts by mass of ethylene thiourea (ACCEL 22S manufactured by Kawaguchi Chemical Industry Co., LTD.) and 1 part by mass of N-phenyl-N'-(1,3-dimethylbutyl)-p-phenylenediamine (Nocrak 6C manufactured by OUCHI SHINKO CHEMICAL INDUSTRIAL CO., LTD.) were kneaded for 20 minutes using an 8-inch roll whose cooling water temperature is set at 40° C. to obtain a rubber composition. The resultant rubber composition was subjected to a heat treatment based on JIS K 6250 using an electric heat press at 170° C. for 20 minutes followed by entry into heated air at 170° C. for 2 hours, thereby preparing a vulcanized rubber.

<Measurement of Mechanical Characteristics of Vulcanized Rubber>

Mechanical characteristics (tensile strength at break, elongation at break) of the vulcanized rubber employing each statistical copolymer of Examples 1 to 6 or homopolymer of Comparative example 1 were measured in accordance with JIS K6251. Passing was admitted when the tensile strength at break is >20 MPa and the elongation at break is >300%. The hardness was measured in accordance with JIS K6253-3.

<Measurement of Oil Resistance of Vulcanized Rubber>

The oil resistance of the vulcanized rubber employing each statistical copolymer of Examples 1 to 6 or homopolymer of Comparative example 1 was measured in accordance with JIS K6258. The oil type employed was IRM903 oil, and the oil resistance was evaluated based on the volume change rate (ΔV) and the weight change rate (ΔW) after immersion for 72 hours at 135° C. Passing was admitted when ΔV is <+30% and ΔW is <+30%.

<Results>

The results of Examples 1 to 6 and Comparative example 1 are indicated in Table 1 shown below.

TABLE 1

| | | Example | | | | | | Comparative Example |
|---|---|---|---|---|---|---|---|---|
| | | 1 | 2 | 3 | 4 | 5 | 6 | 1 |
| Polymerization formulation | | | | | | | | |
| Polymerization temperature | °C. | 40 | 40 | 10 | 20 | 40 | 40 | 40 |
| Chloroprene monomer addition method | — | Continuous | Continuous | Continuous | Continuous | 10 cycles | 20 cycles | At once |
| Polymer structure | | | | | | | | |
| Acrylonitrile monomer binding level | wt % | 8.9 | 16.2 | 9.1 | 9.0 | 9.0 | 8.9 | 0.0 |
| Mn | $10^3$ g/mol | 138 | 130 | 133 | 135 | 134 | 132 | 138 |
| Mw | $10^3$ g/mol | 473 | 442 | 462 | 454 | 453 | 446 | 336 |
| Mw/Mn | — | 3.4 | 3.4 | 3.5 | 3.4 | 3.4 | 3.4 | 2.4 |
| Incorporation formulation | | | | | | | | |
| Polymer | PHR | 100 | 100 | 100 | 100 | 100 | 100 | 100 |
| Nocrak CD | PHR | 2 | 2 | 2 | 2 | 2 | 2 | 2 |
| magnesium oxide | PHR | 4 | 4 | 4 | 4 | 4 | 4 | 4 |
| SRF carbon | PHR | 50 | 50 | 50 | 50 | 50 | 50 | 50 |
| Adekacizer RS735 | PHR | 5 | 5 | 5 | 5 | 5 | 5 | 5 |
| zinc oxide | PHR | 5 | 5 | 5 | 5 | 5 | 5 | 5 |
| ethylene thiourea | PHR | 1.5 | 1.5 | 1.5 | 1.5 | 1.5 | 1.5 | 1.5 |
| Nocrak 6C | PHR | 1 | 1 | 1 | 1 | 1 | 1 | 1 |
| Total | PHR | 168.5 | 168.5 | 168.5 | 168.5 | 168.5 | 168.5 | 168.5 |
| Mechanical characteristics | | | | | | | | |
| TB: tensile strength at break | MPa | 20.7 | 21.5 | 26.1 | 23.9 | 20.0 | 20.4 | 16.3 |
| EB: elongation at break | % | 321 | 378 | 703 | 622 | 302 | 309 | 268 |
| HS: hardness | | 65 | 66 | 65 | 66 | 65 | 65 | 63 |
| Oil resistance test Oil type: IRM 903 135° C. × 72 h | | | | | | | | |
| ΔV | % | +19 | +5 | +16 | +14 | +20 | +18 | +66 |
| ΔW | % | +11 | +2 | +12 | +10 | +15 | +13 | +42 |

While the vulcanized material of each statistical copolymer of Examples 1 to 6 exhibited a hardness equivalent to that of Comparative example 1, it had excellent tensile strength at break and elongation at break and exhibited a satisfactory mechanical strength. In addition, the vulcanized materials of Examples 1 to 6 had oil resistances which were more excellent than that of Comparative example 1. Based on these results, it was confirmed that the vulcanized materials containing the chloroprene-acrylonitrile statistical copolymer of the present invention, which are obtained by the method including a step for continuous addition or 10 cycles or more of intermittent portionwise addition of the chloroprene monomer and whose unsaturated nitrile monomer unit is within the range from 8 to 20% by mass are excellent in terms of the mechanical strength (tensile strength at break: TB, elongation at break: EB) and the oil resistance.

When comparing among Examples, the vulcanized materials of Examples 3 and 4 employing a polymerization temperature within the range of 5 to 20° C. exhibited more excellent mechanical strength, especially elongation at break EB when compared to Examples 1 and 2 employing a polymerization temperature of 40° C.

(2) Experiment Example 2

In Experiment example 2, the effects of a method for adding a chloroprene monomer in a production step and the properties of a chloroprene-acrylonitrile statistical copolymer on the low temperature compression set and the flex fatigue resistance of vulcanized molded articles were verified.

<Measurement of Low Temperature Compression Set of Vulcanized Rubber>

The low temperature compression set of the vulcanized rubber employing each statistical copolymer of Examples 1 to 4 or homopolymer of Comparative example 1 was measured in accordance with JIS K 6262 in the condition involving 0° C. and 72 hours. Passing was admitted when the compression set (CS) is 25% or less, with 20% or less especially being admitted as excellent.

<Measurement of Flex Fatigue of Vulcanized Rubber>

The flex fatigue resistance of the vulcanized rubber employing each statistical copolymer of Examples 1 to 4 or homopolymer of Comparative example 1 was measured in accordance with JIS K6260 at 40° C. Passing was admitted when the flex fatigue resistance was 100,000 cycles or more.

<Results>

The results of Examples 1 to 4 and Comparative example 1 are indicated in Table 2 shown below.

TABLE 2

|  |  | Example | | | | Comparative example |
|---|---|---|---|---|---|---|
|  |  | 1 | 2 | 3 | 4 | 1 |
| Polymerization formulation | | | | | | |
| Polymerization temperature | °C. | 40 | 40 | 10 | 20 | 40 |
| Chloroprene monomer addition method | — | Continuous | Continuous | Continuous | Continuous | At once |
| Polymer structure | | | | | | |
| Acrylonitrile monomer binding level | wt % | 8.9 | 16.2 | 9.1 | 9 | 0 |
| Mn | $10^3$ g/mol | 138 | 130 | 133 | 135 | 138 |
| Mw | $10^3$ g/mol | 473 | 442 | 462 | 454 | 336 |
| Mw/Mn | — | 3.4 | 3.4 | 3.5 | 3.4 | 2.4 |
| Incorporation formulation | | | | | | |
| Polymer | PHR | 100 | 100 | 100 | 100 | 100 |
| Nocrack CD | PHR | 2 | 2 | 2 | 2 | 2 |
| magnesium oxide | PHR | 4 | 4 | 4 | 4 | 4 |
| SRF carbon | PHR | 50 | 50 | 50 | 50 | 50 |
| Adekacizer RS735 | PHR | 5 | 5 | 5 | 5 | 5 |
| zinc oxide | PHR | 5 | 5 | 5 | 5 | 5 |
| ethylene thiourea | PHR | 1.5 | 1.5 | 1.5 | 1.5 | 1.5 |
| Nocrak 6C | PHR | 1 | 1 | 1 | 1 | 1 |
| Total | PHR | 168.5 | 168.5 | 168.5 | 168.5 | 168.5 |
| Low temperature compression set | | | | | | |
| 0° C. × 72 h | % | 15 | 21 | 17 | 16 | 99 |
| Flex fatigue resistance 40° C | | | | | | |
| Number of cycles at break | 10,000 Cycles | 25 | 40 | 37 | 32 | 0.5 |

The vulcanized materials of Examples 1 to 4 exhibited excellent compression set at low temperature and satisfactory flex fatigue resistance when compared to Comparative example 1. Especially from the viewpoint of balance among the oil resistance, the mechanical strength and the low temperature compression set, the vulcanized materials of Examples 1, 3 and 4 were excellent.

The invention claimed is:

1. A method for producing a statistical copolymer containing a chloroprene monomer unit and an unsaturated nitrile monomer unit and having a number average molecular weight (Mn) within a range of 80,000 to 300,000, comprising a step for conducting continuous addition or 10 cycles or more of intermittent portionwise addition of the chloroprene monomer after initiation of a polymerization reaction, wherein during polymerization, the addition of the chloroprene monomer is performed such that a mass ratio between unreacted unsaturated nitrile monomer and a total of unreacted chloroprene monomer and unreacted unsaturated nitrile monomer in a polymerization fluid is kept within a range of ±10% of a target ratio.

2. The production method according to claim 1, further comprising a step for determining a quantity of the chloroprene monomer to be added during time period dt(n+1) between time t(n) and time t(n+1) based on a total quantity of polymerization conversion of the chloroprene monomer and the unsaturated nitrile monomer during time period dt(n) between time t(n−1) and time t(n) wherein a time at which the polymerization reaction is initiated is t(0) and n is an integer of 1 or more, thereby keeping a ratio between unreacted chloroprene monomer and unsaturated nitrile monomer constant.

3. The production method according to claim 1, further comprising, after initiation of the polymerization reaction, the following steps:

a step for calculating the polymerization rate of the chloroprene monomer and the unsaturated nitrile monomer based on a specific gravity of a latex containing the chloroprene monomer and the unsaturated nitrile monomer;

a step for calculating an unreacted chloroprene monomer quantity and an unreacted unsaturated nitrile monomer quantity based on the polymerization rate; and, a step, at a time point when a difference between the chloroprene monomer quantity obtained by multiplying the unreacted unsaturated nitrile monomer quantity by a monomer ratio at a time of polymerization initiation and the unreacted chloroprene monomer quantity becomes identical to a scheduled portionwise addition quantity which is a quantity obtained by dividing a total quantity of the chloroprene monomer scheduled to be added in the intermittent portionwise addition by a number of portionwise addition cycles, for conducting portionwise addition of the chloroprene monomer in the scheduled portionwise addition quantity to the latex.

4. The production method according to claim 1 wherein a xanthic compound is added as a chain transfer agent.

5. The production method according to claim 1 wherein the polymerization temperature is kept at 5 to 20° C.

6. A statistical copolymer containing a chloroprene monomer unit and an unsaturated nitrile monomer unit and having a number average molecular weight (Mn) within a range of 80,000 to 300,000, obtained by the production method according to claim 1.

7. A statistical copolymer containing a chloroprene monomer unit and an unsaturated nitrile monomer unit and having a number average molecular weight (Mn) within a range of 80,000 to 300,000, produced by determining a quantity of the chloroprene monomer to be added during time period dt (n+1) between time t(n) and time t (n+1) based on a total quantity of polymerization conversion of the chloroprene monomer and the unsaturated nitrile monomer during time period dt(n) between time t (n−1) and time t (n) wherein a time at which the polymerization reaction is initiated is t (0) and n is an integer of 1 or more, thereby keeping a mass ratio between the unreacted nitrile monomer and a total of the unreacted chloroprene monomer and the unsaturated nitrile monomer in a polymerization fluid within a range of ±10% of a target ratio.

8. The statistical copolymer according to claim 6 produced by keeping the polymerization temperature at 5 to 20° C.

9. A statistical copolymer containing a chloroprene monomer unit and an unsaturated nitrile monomer unit having a mass ratio between unreacted unsaturated nitrile monomer and a total of unreacted chloroprene monomer and unreacted unsaturated nitrile monomer in a polymerization fluid is kept within a range of ±10% of a target ratio during polymerization, and having a number average molecular weight (Mn) within a range of 80,000 to 300,000, which has, when a vulcanized rubber using the statistical copolymer prepared in accordance with a sample preparation condition (I) is evaluated, an oil resistance to IRM903 oil measured in accordance with JIS K6258 of $\Delta W < +15\%$, a compression set after 72 hours at 0° C. measured in accordance with JIS K 6262 of 25% or less, and a flex fatigue resistance at 40° C. measured in accordance with JIS K 6260 of 100,000 cycles or more, wherein the sample preparation condition (I) comprises:

kneading 100 Parts by mass of the statistical copolymer, 2 parts by mass of 4,4'-bis($\alpha,\alpha$-dimethylbenzyl)diphenylamine, 4 parts by mass of magnesium oxide, 50 parts by mass of a carbon black, 5 parts by mass of a polyether ester-based plasticizer, 5 parts by mass of zinc oxide, 1.5 parts by mass of ethylene thiourea and 1 part by mass of N-phenyl-N'-(1,3-dimethylbutyl)-p-phenylenediamine for 20 minutes using an 8-inch roll whose cooling water temperature is set at 40° C., obtaining a rubber composition, heat-treating the rubber composition based on JIS K 6250 using an electric heat press at 170° C. for 20 minutes, and entering into heated air at 170° C. for 2 hours, and thereby preparing the vulcanized rubber.

10. The statistical copolymer according to claim 9 which enables that, when the vulcanized rubber prepared in accordance with the sample preparation condition (I) using the statistical copolymer is evaluated, the mechanical characteristics measured in accordance with JIS K6251 include a tensile strength at break >20 MPa and an elongation at break >300%.

11. The statistical copolymer according to claim 6 for use in power transmission belts, conveyer belts, hoses, wipers, dip products, seal members, adhesives, boots, rubberized fabrics, rubber rolls, vibration-proof rubbers or sponge products.

12. A latex containing a statistical copolymer according to claim 6.

13. The latex according to claim 12 employed in an adhesive.

14. The latex according to claim 12 employed in a dip product.

15. A resolcinol-formaldehide latex (RFL)-treated product employing the latex according to claim 14.

16. A rubber composition containing a statistical copolymer according to claim 6.

17. A vulcanized molded article containing a rubber composition according to claim 16.

18. The vulcanized molded article according to claim 17 which is a power transmission belt, a conveyer belt, a hose, a wiper, a dip product, a seal member, an adhesive, a boot, a rubber fabric, a rubber roll, a vibration-proof rubber or a sponge product.

19. A vulcanized molded article of a statistical copolymer containing a chloroprene monomer unit and an unsaturated nitrile monomer unit containing the unsaturated nitrile monomer unit at 8 to 20% by mass whose oil resistance to IRM903 oil measured in accordance with JIS K6258 is $\Delta W < +15\%$, wherein the statistical copolymer has a number average molecular weight (Mn) within a range of 80,000 to 300,000, and produced by conducting continuous addition or 10 cycles or more of intermittent portionwise addition of the chloroprene monomer after initiation of a polymerization reaction, wherein during polymerization, the addition of the chloroprene monomer is performed such that a mass ratio between unreacted unsaturated nitrile monomer and a total of unreacted chloroprene monomer and unreacted unsaturated nitrile monomer in a polymerization fluid is kept within a range of ±10% of a target ratio.

20. The vulcanized molded article according to claim 19 whose compression set after 72 hours at 0° C. measured in accordance with JIS K 6262 is 25% or less.

21. The vulcanized molded article according to claim 19 whose flex fatigue resistance at 40° C. measured in accordance with JIS K 6260 is 100,000 cycles or more.

22. A power transmission belt, a conveyer belt, a hose, a wiper, a dip product, a seal member, an adhesive, a boot, a rubber fabric, a rubber roll, a vibration-proof rubber or a sponge product employing a vulcanized molded article according to claim 19.

23. A vulcanized molded article containing a statistical copolymer of a chloroprene monomer unit and an unsaturated nitrile monomer unit containing the unsaturated nitrile monomer unit at 8 to 20% by mass whose oil resistance to IRM903 oil measured in accordance with JIS K6258 is $\Delta W < +15\%$ and whose compression set after 72 hours at 0° C. measured in accordance with JIS K 6262 is 20% or less, wherein the statistical copolymer has a number average molecular weight (Mn) within a range of 80,000 to 300,000, and produced by conducting continuous addition or 10 cycles or more of intermittent portionwise addition of the chloroprene monomer after initiation of a polymerization reaction, wherein during polymerization, the addition of the chloroprene monomer is performed such that a mass ratio between unreacted unsaturated nitrile monomer and a total of unreacted chloroprene monomer and unreacted unsaturated nitrile monomer in a polymerization fluid is kept within a range of ±10% of a target ratio.

24. A seal member or a hose member employing the vulcanized molded article according to claim 23.

25. The vulcanized molded article according to claim 19 whose mechanical characteristics measured according to JIS K6251 are a tensile strength at break >20 MPa and an elongation at break >300%.

* * * * *